US007457581B2

(12) United States Patent
Stout et al.

(10) Patent No.: US 7,457,581 B2
(45) Date of Patent: Nov. 25, 2008

(54) LATENT PROPERTY DIAGNOSING PROCEDURE

(75) Inventors: William F. Stout, Champaign, IL (US); Sarah M. Hartz, Champaign, IL (US)

(73) Assignee: Educational Testing Service, Princeton, NJ (US)

( * ) Notice: Subject to any disclaimer, the term of this patent is extended or adjusted under 35 U.S.C. 154(b) by 153 days.

(21) Appl. No.: 10/970,795

(22) Filed: Dec. 8, 2004

(65) Prior Publication Data
US 2005/0123893 A1 Jun. 9, 2005

Related U.S. Application Data

(63) Continuation of application No. 09/838,129, filed on Apr. 20, 2001, now Pat. No. 6,832,069.

(51) Int. Cl.
*G09B 7/00* (2006.01)
(52) U.S. Cl. ...................................... 434/353; 434/354
(58) Field of Classification Search ................ 434/156, 434/167, 178, 322, 323, 327, 335, 336, 350, 434/351, 353, 354, 362
See application file for complete search history.

(56) References Cited

U.S. PATENT DOCUMENTS

| 6,077,085 | A  | * | 6/2000  | Parry et al. ................... 434/322 |
| 6,105,046 | A  |   | 8/2000  | Greenfield et al. |
| 6,144,838 | A  |   | 11/2000 | Sheehan |
| 6,386,883 | B2 | * | 5/2002  | Siefert ........................ 434/322 |
| 6,460,035 | B1 |   | 10/2002 | Siegwart |
| 6,484,010 | B1 |   | 11/2002 | Sheehan |
| 6,497,577 | B2 | * | 12/2002 | Kanter ........................ 434/236 |
| 6,606,479 | B2 | * | 8/2003  | Cook et al. .................. 434/350 |
| 6,676,412 | B1 | * | 1/2004  | Masterson et al. ........... 434/169 |
| 6,676,413 | B1 |   | 1/2004  | Best et al. |
| 6,685,476 | B1 | * | 2/2004  | Safran, Sr. ................... 434/169 |
| 6,905,340 | B2 | * | 6/2005  | Stansvik ....................... 434/322 |
| 6,953,344 | B2 | * | 10/2005 | Shafrir ........................ 434/323 |
| 6,978,115 | B2 | * | 12/2005 | Whitehurst et al. .......... 434/350 |
| 7,052,277 | B2 | * | 5/2006  | Kellman ....................... 434/118 |
| 7,065,513 | B1 | * | 6/2006  | Bertrand et al. ............... 706/45 |
| 7,137,821 | B2 | * | 11/2006 | Jorgensen et al. ........... 434/323 |

OTHER PUBLICATIONS

L.V. DiBello, W.F. Stout, & L.A. Roussos, Unified Cognitive/Psychometric Diagnostic Assessment Likelihood-Based Classification Techniques, Ch. 15, p. 361-389, Cognitively Diagnostic Assessment, edited Nichols, Chipman, Brennan, published Erlbaum, Mahwah, NJ.*

(Continued)

*Primary Examiner*—Kurt Fernstrom
(74) *Attorney, Agent, or Firm*—Mayer Brown LLP

(57) ABSTRACT

The present invention provides a method of doing cognitive diagnosis of mental skills, medical and psychiatric diagnosis of diseases and disorders, and in general the diagnosing of latent properties of a set of objects, usually people, for which multiple pieces of binary (dichotomous) information about the objects are available, for example testing examinees using right/wrong scored test questions. Settings where the present invention can be applied but are not limited to include classrooms at all levels, web-based instruction, corporate in-house training, large scale standardized tests, and medical and psychiatric settings. Uses include but are not limited to individual learner feedback, learner remediation, group level educational assessment, and medical and psychiatric treatment.

14 Claims, 21 Drawing Sheets

OTHER PUBLICATIONS

S. Embretson and S. Reise, *Item Response Theory for Psychologists* (2000) Chapter 11, published L. Erlbaum, Mahwah, NJ.

S. Embretson and S. Reise, *Item Response Theory for Psychologists* (2000) Chapter 18, p. 273-305, published L. Erlbaum, Mahwah, NJ.

B. Junker, On the Interplay Between Nonparametric and Parametric IRT, with Some Thoughts about the Future *Essays on Item Response Theory 2000*, Ch. 14, p. 247-276, edited Boomsma, van Duijn and Snijders.

S.E. Embretson, Multicomponent Response Models, Ch. 18, p. 305-321, *Handbook of Modern Item Response Theory*, 1997, edited van der Linden and Hambleton, published Springer, New York.

K.K. Tatsuoka, Toward an Integration of Item-Response Theory and Cognitive Error Diagnosis, Ch. 18, p. 453-488, *Diagnostic Monitoring of Skill and Knowledge Acquisition*, L. Erlbaum, Mahwah, NJ.

R.J. Mislevy, Probability-Based Interference in Cognitive Diagnosis, Ch. 3, p. 43-71, *Cognitive Diagnostic Assessment*, 1995, edited Nichols, Chipman and Brennan, published Erlbaum, Mahwah, NJ.

R.J. Patz & B.W. Junker, A Straightforward Approach to Markov Chain Monte Carlo Methods of Item Response Models, *Journal of Educational and Behavioral Statistics*, Summer 1999, vol. 24, No. 2, p. 146-178.

L.V. Dibello, W.F. Stout, & L.A. Roussos, Unified Cognitive/Psychometric Diagnostic Assessment Likelihood-Based Classification Technigques, Ch. 15, p. 361-389, *Cognitively Diagnostic Assessment*, edited Nichols, Chipman, Brennan, published Erlbaum, Mahwah, NJ.

Klaus-Peter Adlassnig, Correspondence, Fuzzy Set Theory in Medical Diagnosis, *IEEE Transactions on Systems, Man and Cybernetics*, vol. SMC-16, No. 2, Mar./Apr. 1986, p. 260-265.

E.H. Herskovits & G.F. Cooper, Algorithms for Bayesian Belief-Network Precomputation, *Methods of Information in Medicine*, vol. 30, No. 2, 1991, p. 81-89.

L. Berman & R.A. Miller, Problem Area Formation as an Element of Computer Aided Diagnosis: A Comparison of Two Strategies Within Quick Medical Reference (QMR), *Methods of Information in Medicine*, vol. 30, No. 2, 1991, p. 90-95.

G.H. Fischer, The Linear Logistic Text Model as an Instrument in Educational Research, *Acta Pshychologica 37*, p. 359-374, North-Holland Publishing Company 1973.

K.K. Tasuoka, Rule Space: An Approach for Dealin with Misconceptions Based on Item Response Theory, *Journal of Educational Measurement*, vol. 20, No. 4, Winter 1983.

R.J. Mislevy, R.G. Almond, D.Yan and L.S. Steinberg, Bayes Nets in Educational Assessment: Where do the Numbers Come From, CRESST/Educational Testing Service, CSE Technical Reports 518, Mar. 2000.

* cited by examiner

FIG. 18

[II] Consider the 7 observations: 10, 4, 2, 5, 4, 2, 8.

9. The mean is
   (a) 2  (b) 3  (c) 4  (d) 5  (e) 8

10. The standard deviation is
    (a) 2  (b) 3  (c) 4  (d) 5  (e) 8

11. The median is
    (a) 2  (b) 3  (c) 4  (d) 5  (e) 8

12. The first quartile is
    (a) 2  (b) 3  (c) 4  (d) 5  (e) 8

13. The third quartile is
    (a) 5  (b) 6.5  (c) 8  (d) 9  (e) 10

[III] The next four questions refer to data sets and their histograms in general.

14. All large data sets have bell-shaped histograms. Is this statement true or false?
    (a) True  (b) False 15. For large data sets, very close to 50% of the data are smaller than the mean and very close to 50% are greater than the mean.
    (a) True for every such large data set
    (b) False for some large data sets 16. The median is preferable to the mean as a measure of the center when a data set
    (a) is large.
    (b) has outliers (unusually large or unusually small values).
    (c) is symmetric but is not bell shaped.
    (d) has an odd number of points in it.

17. Suppose a large data set has a histogram that is roughly bell-shaped. Suppose that there are no outliers. Then
    (a) roughly 68% of the data lies within $\pm s$ of $\bar{x}$.
    (b) exactly 68% of the data lies within $\pm s$ of $\bar{x}$.
    (c) roughly 95% of the data lies within $\pm 3s$ of $\bar{x}$.
    (d) exactly 95% of the data lies within $\pm 3s$ of $\bar{x}$.

18. The median is preferable to the mean as a measure of the center when a data set
    (a) is small.
    (b) is symmetric but not bell-shaped.
    (c) is strongly skewed to the left.
    (d) involves biological or financial data.

FIG. 19

| item | Attributes | | | | | | | |
|---|---|---|---|---|---|---|---|---|
| | 1 | 2 | 3 | 4 | 5 | 6 | 7 | 8 |
| 1 | 1 | 0 | 0 | 0 | 0 | 0 | 0 | 0 |
| 2 | 1 | 0 | 0 | 0 | 0 | 0 | 0 | 0 |
| 3 | 1 | 0 | 0 | 0 | 0 | 0 | 0 | 0 |
| 4 | 1 | 0 | 0 | 0 | 0 | 0 | 0 | 0 |
| 5 | 1 | 0 | 0 | 0 | 0 | 0 | 0 | 0 |
| 6 | 1 | 0 | 0 | 0 | 0 | 0 | 0 | 0 |
| 7 | 1 | 1 | 0 | 0 | 0 | 0 | 0 | 0 |
| 8 | 1 | 0 | 1 | 0 | 0 | 0 | 0 | 0 |
| 9 | 0 | 0 | 1 | 0 | 0 | 0 | 0 | 0 |
| 10 | 0 | 0 | 0 | 1 | 0 | 0 | 0 | 0 |
| 11 | 0 | 1 | 0 | 0 | 0 | 0 | 0 | 0 |
| 12 | 0 | 1 | 0 | 0 | 0 | 0 | 0 | 0 |
| 13 | 0 | 1 | 0 | 0 | 0 | 0 | 0 | 0 |
| 14 | 1 | 0 | 0 | 0 | 0 | 0 | 0 | 0 |
| 15 | 0 | 1 | 0 | 0 | 0 | 0 | 0 | 0 |
| 16 | 0 | 0 | 1 | 0 | 0 | 0 | 0 | 0 |
| 17 | 1 | 0 | 1 | 1 | 0 | 0 | 0 | 0 |
| 18 | 0 | 1 | 1 | 0 | 0 | 0 | 0 | 0 |
| 19 | 0 | 1 | 1 | 0 | 0 | 0 | 0 | 0 |
| 20 | 1 | 0 | 1 | 0 | 0 | 0 | 0 | 0 |
| 21 | 1 | 0 | 0 | 1 | 0 | 0 | 0 | 0 |
| 22 | 1 | 0 | 0 | 1 | 0 | 0 | 0 | 0 |
| 23 | 0 | 0 | 0 | 0 | 0 | 1 | 0 | 0 |
| 24 | 0 | 0 | 0 | 0 | 0 | 1 | 0 | 0 |
| 25 | 0 | 0 | 0 | 0 | 0 | 1 | 0 | 0 |
| 26 | 0 | 0 | 1 | 0 | 0 | 0 | 0 | 0 |
| 27 | 0 | 0 | 1 | 0 | 0 | 0 | 0 | 0 |
| 28 | 0 | 0 | 0 | 1 | 0 | 0 | 0 | 0 |
| 29 | 0 | 0 | 0 | 1 | 0 | 0 | 0 | 0 |
| 30 | 0 | 0 | 0 | 0 | 0 | 1 | 0 | 0 |
| 31 | 0 | 0 | 0 | 0 | 0 | 0 | 1 | 0 |
| 32 | 0 | 0 | 0 | 0 | 0 | 0 | 1 | 0 |
| 33 | 0 | 0 | 0 | 0 | 0 | 0 | 1 | 1 |
| 34 | 0 | 0 | 0 | 0 | 0 | 0 | 1 | 1 |
| 35 | 0 | 0 | 0 | 0 | 0 | 0 | 1 | 1 |
| 36 | 0 | 0 | 0 | 0 | 0 | 0 | 1 | 1 |
| 37 | 0 | 0 | 0 | 0 | 1 | 0 | 0 | 0 |
| 38 | 0 | 0 | 0 | 0 | 1 | 0 | 0 | 0 |
| 39 | 0 | 0 | 0 | 0 | 1 | 0 | 0 | 0 |
| 40 | 0 | 0 | 0 | 0 | 0 | 1 | 0 | 0 |
| total | 13 | 7 | 9 | 6 | 3 | 5 | 6 | 4 |

LATENT PROPERTY DIAGNOSING PROCEDURE

CROSS REFERENCE TO RELATED APPLICATIONS

This application is a continuation of U.S. application Ser. No. 09/838,129 filed Apr. 20, 2001 now U.S. Pat. No. 6,832,069 which is hereby incorporated herein by reference in its entirety.

BACKGROUND OF THE INVENTION

1. Field of the Invention

The present invention provides a method of doing cognitive, medical and psychiatric, and diagnosis in general of latent properties of objects that are usually people using binary scored probing of the objects.

2. Description of the Prior Art

Part 1: Background Prerequisite to Description of Prior Art

Standardized Testing as Currently Practiced; Cognitive Diagnosis Defined. Before describing the prior art related to the invention, it is necessary to discuss needed background material. Both large scale standardized testing and classroom testing typically use test scores to rank and/or locate examinees on a single scale. This scale is usually interpreted as ability or achievement in a particular content area such as algebra or the physics of motion. Indeed, the two almost universally used approaches to "scoring" standardized tests, namely classical test theory (Lord, F. and Novick, M., 1968, *Statistical Theories of Mental Test Score*, Reading, Mass., Addison Wesley—although an ancient book, still the authority on classical test theory) and "unidimensional" item response theory (IRT), assign each examinee a single test score. An "item" is merely terminology for a test question. The standardized test score is usually the number correct on the test, but can include in its determination partial credit on some items, or the weighting of some items more than others. In classroom testing, teachers also typically assign a single score to a test.

The result of this single score approach to testing is that the test is only used either to rank examinees among themselves or, if mastery standards are set, to establish examinee levels of overall mastery of the content domain of the test. In particular, it is not used to produce a finely grained profile of examinee "cognitive attributes" within a single content domain. That is, an algebra test can be used to assess John's overall algebra skill level relative to others or relative to the standard for algebra mastery but it cannot determine cognitive attribute mastery, such as whether John factors polynomials well, understands the rules of exponents, understands the quadratic formula, etc., even though such fine grained analyses are clearly to be desired by instructor, student, parent, institution, and government agency, alike.

Herein, cognitive diagnosis refers to providing fine-grained profiles of examinee cognitive attribute mastery/non-mastery.

Statistical Method or Analysis The cognitive diagnostic algorithm that forms the core of the invention is a particular statistical method. A statistical method or analysis combines collected data and an appropriate probability model of the real world setting producing the data to make inferences (draw conclusions). Such inferences often lead to actual decision-making. For instance, the cognitive diagnosis indicating that Tanya is deficient on her mastery of the quadratic formula can be followed up by providing remediation to improve her understanding of the quadratic formula.

To clarify what a statistical method is, an overly simple, non-cognitive example is illustrative. As background, it seems worth noting that a valuable aspect of statistical methods is that they explicitly state the inherent error or uncertainty in their inferences. In particular, a valid statistical analysis is careful not to draw inferences that go beyond what is reasonably certain based on the available information in the data, accomplishing this by including a measure of the uncertainty associated with the inference, such as providing the standard error, a fundamental statistical concept. As such, this makes any statistical method for doing cognitive diagnosis superior to any deterministic model based method (variously called rule-based, artificial intelligence, data-mining, etc., depending on the particular deterministic approach taken).

The difference between a deterministic inference and a statistical inference is illustrated in a simple setting. A coin is claimed to be loaded in favor of coming up heads. It is tossed 10 times and produces 7 heads. The non-statistical, deterministic approach with its inherent failure to address possible inference error or uncertainty simply reports that the inferred probability p of heads is 0.7 and hence concludes that the claim is true. The statistical approach reports that even though the most likely probability p of heads is indeed 0.7, nonetheless, because of the uncertainty of this inference due to the very limited amount of data available, all that can really be confidently predicted is that $0.348 \leq p \leq 0.933$. Thus from the statistical inference perspective, there is not strong evidence that the coin is unfair. This statistical perspective of appropriate caution is the superior way to proceed.

Similarly, cognitive diagnoses using the Unified Model (UM) discussed hereafter will only assign attribute mastery or attribute non-mastery to an examinee for a particular attribute when the examinee test data provides strong evidence supporting the particular conclusion drawn, like Jack's mastery of the algebraic rules of exponents.

Now a non-cognitive example of a statistical method in more detail than the illustration above is given.

Example 1. A drug with unknown cure probability p (a number between 0 and 1) is administered to 40 ill patients. The result is that 30 are cured. The standard binomial probability model is assumed (that is, it is assumed the patients respond independently from one another and there is the same probability of cure for each patient). Based on this model and the data, it is statistically inferred from the mathematical properties of the binomial probability model that the actual cure rate is p=0.75 with confidence that the error in this estimate is less than ±0.14. Thus, the inference to be drawn, based on this limited amount of data, is that p lies in the interval (0.60,0.89). By contrast, if there were 400 patients in the drug trial (much more data, that is) with 300 cures occurring, then it would be inferred p=0.75 as before, but now with much more precise confidence that the estimation error is less than ±0.04. More data provides more confidence that the inherent uncertainty in the inference is small.

Educational Measurement, Item Response Theory (IRT), and the Need for Educational Measurement/IRT-based Cognitive Diagnostic Models. The current paradigm that dominates probability modeling of educational test data is item response theory (Embretson, S. and Reise, S. (2000) *Item Response Theory for Psychologists*. Mahwah, N.J., Lawrence Erlbaum). This assigns a probability of getting an item right to be a function of a single postulated latent (unobservable) ability variable, always interpreted as a relatively broad and coarse-grained ability like algebra ability. Different examinees are postulated to possess different levels of this latent ability. Since the higher the level the greater the probability of getting the item right, it is justified to call this latent variable "ability". FIG. 1 shows the standard logistic item response function (IRF) of an item as a function of ability θ. Each such function provides P(θ)=probability of getting an item right for a typical examinee of ability θ.

Typically, as herein, the scale for examinee ability is such that ability less than −2 indicates very low ability examinees (the lowest 2.5%), 0 indicates an average ability examinee and above 2 indicates very high ability examinees (the highest 2.5%). IRT based statistical methods are currently heavily used in educational measurement to statistically assess (infer from test data and the IRT model) examinee latent ability levels.

Educational measurement is the applied statistical science that uses probability models and statistical methods to analyze educational data (often test data) to provide information about learning processes and about various educational settings and to evaluate individual level and group level (state, school district, nation, etc.) intellectual performance.

A modern development receiving major emphasis in educational measurement is the attempt to develop new measurement models of test settings that allow one through statistical analysis of test data to cognitively diagnose examinees. Cognitive diagnosis, as already indicated, refers to a relatively fine-grained analysis that evaluates examinees in terms of which specific skills (generically called "attributes") in a general subject area each examinee possesses or lacks (see Frederiksen, N., Glaser, R., Lesgold, A., and Schaflo, M., 1990, *Diagnostic Monitoring of Skill and Knowledge Acquisition*. Mahwah, N.J., Lawrence Erlbaum; and Nichols, P., Chipman, S., & Brennan, R., *Cognitively Diagnostic Assessment*, 1995, Erlbaum, Hillsdale, N.J. for edited sets of articles dedicated to modem cognitive diagnosis). These two examinee states are referred to as mastery (possessing the attribute) and non-mastery (lacking the attribute). Take algebra for example, and recall the partial list of algebra attributes given above: factoring, quadratic formula, etc. Rather than just using an examinee's test performance to assign an algebra score, cognitive diagnosis focuses on assessing an examinee with respect to these individual algebra attributes. For example, based on the test performance, an examinee might be judged to have "mastered" the quadratic formula but to have not mastered factoring. Such cognitive diagnostic capabilities are obviously of great practical importance both for standardized testing and testing used in instructional settings, such as those occurring in the classroom or using learning-at-a-distance WEB based courseware.

Example 2: A need for cognitive diagnosis. One of the inventors, an instructor of a college level introductory statistics course, gave an exam on the first three chapters of the text. The items were constructed to represent the distinct concepts taught in the three chapters. It was deserved to evaluate the students by more than their score on the exam; specifically how well they understand the concepts that were taught. After the test was constructed, a list of the eight concepts, or attributes, was compiled: (1) histogram, (2) median/quartile, (3) average/mean, (4) standard deviation, (5) regression prediction, (6) correlation, (7) regression line, and (8) regression fit. As expected, some items involved more than one attribute per item. On the forty-item exam, each attribute appeared in an average of six items. Evaluating the test on an attribute level instead of using the total score would help in the necessary determination of areas for which review by the student was necessary; and it would help the each student identify what he/she should study. This example is developed into a simulated example of the present invention in the Description of the Preferred Embodiments section hereafter.

In spite of its clear potential value to society, cognitive diagnosis, a difficult area of application, has been slow getting off the ground. Mathematical models developed by cognitive scientists/psychologists and computer scientists for scholarly purposes are designed with a different purpose than cognitive diagnosis in mind, namely to understand in detail how mental cognitive processing occurs, and often also how it evolves over time (learning). As such, these models are inherently ill-suited for cognitively diagnostic purposes. They are both deterministic and parametrically very complex, and for both reasons they tend to perform poorly when they are used to do cognitive diagnosis in typical test settings using simply scored items, where the amount of data is limited and the data are clearly subject to random variation. Just because an examinee is judged to have mastered the major relevant attributes needed to answer an item correctly, it does not follow that the examinee will indeed get the item right. Similarly, the lack of mastery of one required major relevant attribute does not guarantee that an examinee will get the item wrong.

Positivity Introduced A lack of consistency with what is predicted by the deterministic cognitive model is what is called positivity. It is simply the aspect of a measurement model that admits a probabilistic structure linking attribute mastery and correct use of the mastered attribute in solving an item. For example Towanda may be judged a master of the rules of exponents but may apply her understanding of exponents to an item incorrectly because the needed competency concerning the rules of exponents is exceptionally high for the item Towanda is trying to solve and in fact is higher than that possessed by Towanda, even though she is a master of the attribute rules of exponents.

Overfitting the Data: a Fatal Flaw in Doing Inference Using Deterministic Models It has already been discussed that deterministic models can go beyond the available information in the data by ignoring the inherent uncertainty in the data and thereby "over-predicting". In particular, such deterministic "data-mining" models, as lampooned in the comic strip Dilbert recently, because of their tendency to over-predict, can tend to find seemingly systematic and thus reportable patterns in the data that simply are just accidents of random noise and thus don't represent anything real. In particular, predictions based on them often do not hold up in new analogous data sets and thus are unreliable and dangerous. Statisticians call this phenomenon of looking at random noise and inferring a systematic "signal", or pattern in the data, over-fitting the data. Such over-fitting is a direct consequence of not including information about the level of uncertainty in the inference process involved.

A variation of the simple coin tossing illustration discussed earlier may help illustrate the over-fitting issue. If a possibly unfair coin is tossed four times and comes up as four heads, the most simplistic over-fitted deterministic approach might conclude that the coin will always comes up heads, thus predicting that the pattern to be expected for new coin tossing will be to always get heads. Whereas, the probabilistic statistical approach merely concludes that all that can be inferred is that the unknown probability of heads lies in the interval (0.4,1). From this appropriately cautious perspective, it is thus quite possible the coin is actually fair!

The UM, upon which the present invention is in part based, is statistical and hence, as is crucial, avoids over-fitting of the data by predicting attribute masteries and non-masteries for examinees only when there is strong evidence to support such predictions.

The widely used probabilistic "unidimensional" IRT models, while tractable both mathematically and statistically and hence able to cope appropriately with random examinee variation by their probabilistic nature (in particular, not overfitting the data), are unfortunately too parametrically simplistic to be used as vehicles to theoretically underpin fine-grained cognitive diagnoses. That is, these models deal with ability at the coarse-grained ability level (e.g., ability in introductory statistics) and as such are incapable of dealing at the fine-grained cognitive attribute ability level (e.g., mastery or not of interpreting histograms, calculating means, etc.).

There is a new and promising effort to marry the deterministic cognitive science tradition and the probabilistic measurement/IRT tradition to produce tractable and realistic probabilistic cognitive diagnostic models that function at the cognitive attribute level.

These new models are far more complex than the standard IRT models. However, they are far less complex than the typical deterministic cognitive science models discussed above. In particular they avoid overfitting the data. The UM is one of these new complex probabilistic models.

Part 2. Description of Prior Art

Probably the first cognitively oriented measurement model to function in the IRT tradition is Gerhardt Fischer's linear logistic model (Fischer, G (1973) Linear logistic test model as an instrument in educational research. Acta Psychologica, 37, 359-374). This is of historical interest only because it cannot by its nature actually do cognitive diagnosis of examinee test data. By now however, there are several important IRT-based models that focus on the cognitive modeling of test responses, each of which constitutes prior art. In particular, the statistical models of Kikumi Tatsuoka, Robert Mislevy, Susan Embretson, and Brian Junker as detailed below, are the relevant examples from the prior art perspective. Further, an early, primitive, incomplete, and unusable version of the UM, utilized by the present invention, appeared in DiBello, L, Stout, W, and Roussos, L, 1995, *Unified Cognitive Psychometric Assessment Likelihood-Based Classification Techniques*. In Nichols, et al. *Cognitively Diagnostic Assessment*. Mahway, N.J., Lawrence Erlbaum, and is central from both the prior art perspective and in enabling one to understand the current UM. The non-probabilistic (deterministic) cognitive models are numerous and highly specialized. They are so distinct from the UM in approach and so ill-suited for practical cognitive diagnoses.

The Prior Art UM Procedure Proposed in DiBello et al. The 1995 version of the UM is the most relevant instance of prior art.

The flow chart of FIG. 2 illustrates the UM Cognitive Diagnostic (UMCD) procedure as proposed in DiBello et al. Some of its elements are common to the current UMCD algorithm of the present invention. The present invention uses innovations and modifications of the proposed UM approach of DiBello et al. As background, it assumed i=1, 2, . . . , n items, and j=1, 2, . . . , N examinees; and k=1, 2, . . . , K attributes. The result of administering the test is the examinee responses data matrix $$X = \{X_{ij}\}.$$

Here X is random, reflecting the fact that a test administration is modeled as a random sampling of examinees who then respond randomly to a set of test items. Then X=x is the result of carrying out an actual test administration and producing observed data x (Block 207). Thus x is an n by N matrix of 0s (0 denoting an incorrect response for an item/examinee combination) and 1s (1 denoting a correct response for the item/examinee combination). The jth column represents the responses to the n test items for a particular examinee j. For example if two examinees took a three item test, then x might be $$\begin{matrix} 1 & 0 \\ 1 & 1 \\ 0 & 0 \end{matrix}$$

indicating that the first examinee got the first two items right and the second examinee got only the second item right.

It should be noted that a parameter of a scientific model in general and of a probability model in particular is an unknown quantity in the model that must be statistically determined from data for each particular application of the model, with the value of this parameter varying from application to application. The parameters of the n item, N examinee UM, generically denoted by ω are given by $$\omega = (\alpha, \underline{\theta}; r, \pi, \underline{c})$$

where $(\alpha, \underline{\theta})$ are the examinee parameters and $(r, \pi, \underline{c})$ are the item parameters, the latter sometimes referred to as the test structure. Often examinee parameters will be subscripted by j to indicate they are those of Examinee j, and item parameters will be subscripted by i or both i and k to indicate that they belong to Item i and possibly specific to Attribute k. Each of the parameters of ω are carefully explained below. The flow chart in FIG. 2 diagrams in principle (such diagnoses were not possible for the 1995 UM of DiBello et al) the main stages of how one would use the UM of DiBello et al to carry out a cognitive diagnosis. In fact, statistical cognitive diagnostic procedures typically have much in common with FIG. 2, with one essential difference usually being in how the probability model f(X|ω) is built.

Basic concepts of the UM presented in DiBello et al are explained by referring often to FIGS. 2 and 3. As an illustration of the typical dimensions of a cognitive diagnostic setting, in our diagnostic application to the classroom statistics test, there were N=500 examinees, viewed as the approximate number of students taking an introductory statistics course in a large university. This example is developed into a simulation example demonstrating cognitive diagnostic effectiveness of the present invention discussed below in the Description of the Preferred Embodiments section. The examination had n=40 items, testing the statistical content from the first three chapters of the textbook used in the course. It is assumed that different items require different combinations of the K attributes. In our example, K=8, the number of major concepts tested on the statistics exam.

Recall that an "attribute" is a general term for any bundle of knowledge that can be judged as mastered or not mastered. The selected attributes (Block 201 of FIG. 2) to be used to build the item/attribute incidence matrix (Block 205 of FIG. 2) are defined by the user of the algorithm and can be anything the user wishes. Indeed the freedom of the user to choose attributes unconstrained by any particular cognitive theory of learning and/or mental processing is a real strength of the UM. That is, unlike many other approaches to cognitive diagnosis that embrace and hence depend on understanding and accepting a particular theory of cognitive mental processing, the UM allows the user to select any attributes based on any conceptualization of learning, mental functioning, or cognition, even a highly informal structure that would be accessible to an instructor of a typical classroom course. Each of the N examinees has K attributes and hence the α component of ω is a matrix of dimension N by K. Here each row of a corresponds to a single examinee and has K elements (0's and 1's). An 0 indicates examinee nonmastery and a 1 indicates examinee mastery.

The purpose of a UM model based cognitive diagnosis is to use the available test data x that results from administering the test (Block 207 of FIG. 2) to infer (Block 213 of FIG. 2) for each examinee which of the K attributes there is strong evidence that she has mastered and which there is strong evidence that she has not mastered (noting that for each examinee there will likely be certain attributes for which there is not strong evidence of either mastery or non-mastery).

The required input data to initiate the proposed UM algorithm consists of two data files that are relatively easy to understand and produce without the user needing a sophisticated understanding of cognitive science, this an advantage of the UMCD relative to other prior art. First, for every item, a list of the attributes required to be simultaneously mastered in order to correctly solve the item is selected (Block 201 of FIG. 2). Often, the user/practitioner first decides which attributes to cognitively diagnose in the particular educational setting and then constructs the needed test items (Block 203 of FIG. 2). Sometimes the user constructs the test items first and then selects the attributes to be diagnosed.

Then the user decides for each item which of these attributes are required, thus producing the n by K item/attribute incidence matrix (Block 205 of FIG. 2). An example of an item/attribute incidence matrix for the statistics test diagnostic example is given in FIG. 18 described in the Description of the Preferred Embodiments section.

It is emphasized that the user of a UM-based diagnostic algorithm, such as a school district curriculum specialist or college instructor, typically carries out the activities in Blocks 201, 203, and 205 of FIG. 2, namely selecting attributes, constructing test items, and building the item/attribute incidence matrix. In particular, the user typically chooses the relevant attributes and designs the questions to measure these attributes (in either order), and then decides which of the chosen attributes are required for the correct solution of each item. This relatively easy user activity may be assisted by consultants with personal knowledge of UMCD or by referencing a UMCD tutorial presenting the basic principles of good cognitive diagnosis item manufacture, attribute definition, and incidence matrix construction for use with the UMCD program.

As an example of an item/attribute incidence matrix, consider three items and four attributes. Then the incidence matrix $$\begin{array}{c} \text{Attributes} \\ \text{Items} \begin{array}{cccc} 0 & 1 & 1 & 0 \\ 1 & 0 & 0 & 0 \\ 0 & 0 & 1 & 1 \end{array} \end{array}$$

defines that Item 1 requires Attributes 2 and 3, Item 2 requires Attribute 1, and Item 3 requires Attributes 3 and 4.

Second, based on the administering of the test to the examinees, the examinee response data consists of a record for each examinee of which items were answered correctly and which items were incorrectly answered. Notationally, this is expressed as follows:

$X_{ij}$=0 if Examinee j answered Item i incorrectly
  1 if Examinee j answered Item i correctly For example consider the test responses of two examinees responding to four items.
  Examinee 1 responses: 0 0 1 1
  Examinee 2 responses: 1 0 0 1

This shows Examinee 1 got Items 3 and 4 right, and Examinee 2 got Items 1 and 4 right. As already indicated, all of these $x_{ij}$ responses are collected together to form the matrix of responses test data examinee responses x.

Recall that for each examinee α denotes the (unknown) latent vector of length K indicating for each of the K attributes examinee mastery (denoted by a 1) and examinee nonmastery (denoted by a 0). For example $\underline{\alpha}_j$=(1,0,1,1,0)

means that Examinee j has mastered attributes 1, 3, and 4 and has not mastered attributes 2 or 5. Inferring what $\underline{\alpha}$ is for each examinee is the goal of cognitive diagnosis.

Block 209 of FIG. 2, which occurs after building the incidence matrix (Block 205 of FIG. 2) consists of building the probability model f(X|ω), recalling that ω=(α, θ, r, π, c) denotes the item and examinee parameters of the n item by N examinee model. To understand this block, which is the heart of the UM, certain technical concepts must be introduced. Referring to the schematic of the UM probability model given in FIG. 3 for one item/examinee response $X_{ij}$ is especially useful here.

The Basic Equations of the DiBello et al UM as Partially Indicated by the FIG. 3 The UM uses the notion of an item response function (IRF), as do all IRT-based models. An IRF is an increasing S-shaped curve bounded by 0 below and 1 above. In the usual IRT model setting this provides the probability of getting an item correct as a function of a continuous latent ability such as statistics ability, traditionally denoted by θ. Graphically, such an IRF is represented in FIG. 1. The notation P(θ) refers to the probability of getting the item correct for an examinee of latent ability θ. The formulas for the UM depend on using the FIG. 1 IRF.

The basic building block of the UM (Block 209 of FIG. 2) is to develop an expression for the probability of a correct response to Item i by Examinee j where the examinee possesses a latent residual ability $\theta_j$ and a latent attribute vector $\underline{\alpha}_j=(\alpha_{j1},\ldots,\alpha_{jk})$, where each component $\alpha_{jk}$ equals 0 or 1 for each of the K attributes according as attribute k is not mastered or is mastered. The probability model for one examinee responding to one item is given next.

$$\text{Prob}(X_{ij}=1|\omega)=S_{ij} \times P(\theta_j+c_i), \quad (1)$$

where the IRF is given in FIG. 1 and $S_{ij}$ is explained below. Here, "|ω" simply means that the probability that $X_{ij}$=1 is computed when the parameter values are equal to ω. A schematic representing the parametric influences producing the basic equation (1) is given in FIG. 3. Because the only possible values for $X_{ij}$ are 1 and 0, elementary probabilistic logic yields $$\text{Prob}(X_{ij}=0|\omega)=1-\text{Prob}(X_{ij}=1|\omega)$$

Moreover, in IRT, examinees are modeled to respond independently of each other. Also by the basic IRT modeling principle of local independence, responses to different items for a collection of examinees all having the same set of values of the examinee parameters (α,θ) are modeled to be independent of each other. In probability models, the probability of a set of independent events all happening simultaneously is gotten by multiplying the probabilities of the individual events together. Thus the single item and examinee model of Equation 1 becomes for the set of all N examinees and n items $$f(x|\omega) = \text{Prob}(X=x|\omega) = \Pi\Pi\text{Prob}(X_{ij}=x_{ij}|\omega) \quad (2)$$

Here the symbol ΠΠ indicates taking the product over the range of i and j, namely over the outer product as j ranges from 1 to N and over the inner product as i ranges from 1 to n. For emphasis, note that it is the independence of $X_{ij}$ responses for different examinees and for different items that allows the double product in the basic UM IRT model given by Equation 2. Further $x_{ij}$ denotes the i,j$^{th}$ member of x and is either a 1 or a 0 according as Item i is answered correctly or incorrectly by Examinee j.

The Core UM Concepts of Positivity and Completeness In order to understand Equations 1 and 2, which comprise the very essence of the UM, it is noted that the UM postulates two cognitive concepts of fundamental importance and considerable usefulness, namely positivity and completeness. The first factor, $S_{ij}$, of Equation 1 models positivity and the second factor $P(\theta_j+c_i)$ models completeness.

Indeed, the introduction of completeness, which is modeled by the continuous (or just as easily, can use a many valued discrete variable θ) latent variable θ in the second factor, is unique to the UM among cognitive diagnostic models. Further, the combining of the two fundamental concepts of completeness and positivity in the UM, as reflected in the multiplication of the two factors in equation 1 also distinguishes the UM from all other IRT-based cognitive diagnostic models. Equations 1 and 2 are now explained.

Completeness First the second factor $P(\theta_j+c_i)$ of Equation 1 is considered, which models the degree of completeness for Item i and the prescribed attributes of the UM. The parameter $c_i$, which varies from item to item, is the completeness parameter. When developing the UM equations, one core aspect of the UM is that in order to keep the number of parameters per item to a reasonable and hence statistically tractable number relative to the size of the available data set, intentionally trying to explicitly model the role of many minor yet influential latent attributes is omitted. An influential attribute means that attribute mastery versus non-mastery changes the probability of answering the item correctly. When these influential but minor attributes are omitted, $c_i$ quantifies the relative combined influence of these omitted attributes as compared with the combined influence of the explicitly modeled attributes $\underline{\alpha}$ upon examinee responding to Item i.

To be precise, suppose that the accurate and complete (in the sense of including all the attributes that in fact influence examinee item performance) cognitive diagnostic model for the university statistics examination discussed above (such as a cognitive scientist more interested in basic science than doing practical cognitive diagnostics might produce after conducting an intensive and detailed cognitive psychological study of a few of the students in the college introductory statistics) includes 200 attributes. Suppose that for the sake of statistical analysis tractability with the limited amount of examinee data available and the fact that the test has only 40 items the model is restricted to explicitly having 8 attributes in the UM's incidence matrix. Thus 8 attributes are selected which are believed to be important in determining examinee test performance, including all the attributes the instructor wishes to cognitively diagnose. Then the role of $\theta_j+c_i$ is to parsimoniously encode the influence of the missing 192 less important and omitted attributes for Examinee j and Item i. For clarity note that in practice one has little idea how many or what the excluded minor attributes are. That is, the user does not need to have figured out what all the minor attributes are in a test situation in order to build a UM, this a big advantage over traditional cognitive modeling.

It should be noted that the residual ability $\theta_j$ functions as the combined Examinee j attribute-based ability on the 192 excluded attributes. This modeling technique of allowing θ to parsimoniously "soak up" the influence of the 192 minor attributes is one of the major reasons the UMCD approach is superior to other IRT-based cognitive diagnostic approaches.

Then, the role of $c_i$ for an item is to proportion out the relative importance of the major included attributes $\underline{\alpha}_j$ versus the excluded minor but still influential attributes as built into the UM through $\theta_j$ in determining examinee item performance.

Assume, as is standard in IRT modeling, that θ is a standard normal random variable (the well-known "bell-shaped" curve), as shown in FIG. 4.

Note by FIG. 4 that about ⅔ of all examinee abilities are between −1 to +1, while virtually all are between −3 and +3. Thus, for example, a θ=0 examinee has average overall ability on the θ composite representing the 192 excluded attributes while a θ=2 examinee is of very high ability on the excluded attributes.

The degree of completeness of an item (i say) is quantified by $c_i$ in the following manner. For some items, $c_i$ will be large (for example $c_i$=2.5), indicating $P(\theta+c_i)\approx 1$ for most examinees (as seen by inspecting the IRF of FIG. 1 where $P(\theta+c_i)\approx 1$ clearly holds unless an examinee's θ is unusually small), and hence completeness holds and examinee performance on those items is largely determined by the positivity factor $S_{ij}$ that explicitly models the influence probabilistically of the UM-model-included attributes $\underline{\alpha}$. That is, examinee performance is primarily determined by the important attributes (those explicitly chosen by the user) that make up $\underline{\alpha}$. In this case the major explicitly modeled attributes are relatively complete for the items in question.

Similarly, for other items $c_i$ will be small (for example $c_i$=0.5), indicating $P(\theta+c_i)<1$ (substantially) for most examinees. Thus, as expressed by the value of $P(\theta+c_i)$, the role of the excluded attributes modeled by the residual ability θ is quite important in influencing examinee responding as well as the included major attributes also being quite important. In this case the included modeled attributes are relatively incomplete for the item in question.

Because this is rather abstract and yet is key to the understanding of the completeness concept, a simple example is given. Consider an examinee of average ability θ=0. Suppose that $c_i$=3, indicating a very complete item for which examinee response behavior is is controlled almost entirely by the included attributes. Then note, referring to FIG. 1, that the examinee's chances of correctly applying the excluded minor attributes correctly to the item is given by $P(\theta+c_i)=P(3)\approx 1$. Thus the model, appropriately, lets examinee mastery/non-mastery of the major attributes effectively be the sole determinant of correct examinee performance on the item, as expressed by $S_{ij}$ of Equation 2.

Positivity The second cognitive concept of fundamental importance in the UM is positivity, which is made explicit in Equation 3 below for $S_{ij}$. This gives the probability that the model's listed attributes that are in particular required for Item i according to the incidence matrix (Block 205 of FIG. 2) are applied correctly to the solution of Item i (which requires certain attributes to be mastered) by Examinee j (who has mastered certain attributes)

$$S_{ij} = [(\pi_{i1})^{\alpha_{j1}} \times (\pi_{i2})^{\alpha_{j2}} \times \ldots \times (\pi_{im})^{\alpha_{jm}} [(r_{i1})^{1-\alpha_{j1}} \\ \times (r_{i2})^{1-\alpha_{j2}} \ldots \times (r_{im})^{1-\alpha_{jm}}] \quad (3)$$

Note that when an $\alpha=1$ only its corresponding $\pi$ is a factor in $S_{ij}$ (not its corresponding r) and when an $\alpha=0$, only its corresponding r is a factor in $S_{ij}$ (not its corresponding $\pi$). Thus $S_{ij}$ is the product of m factors, each a $\pi$ or an r. Here it is to be understood that the m attributes of the above formula are the attributes specified as required by Item i in the item/attribute incidence matrix. Also, $\alpha_{j2}=1$ or 0 denotes the mastery or nonmastery state respectively of Examinee j on Attribute 2, etc.

Recalling Equations 1, 2, and 3, it is seen that the item/attribute incidence matrix is needed input into determining $f(X|\omega)$ as the arrow connecting Block 205 to 209 in FIG. 2 indicates. This is because the item/attribute incidence matrix provides for each Item i which m attributes are needed for its solution. In particular the $\pi$'s and r's appearing in Equation 3 correspond only to the attributes that are required for Item i.

Definition of the Positivity Parameters $\pi$'s and r's of Equation 3 The r's and $\pi$'s as follows:

$r_{ik}$=Prob(Attribute k applied correctly to Item i given that the examinee has not mastered Attribute k.)

Similarly, $\pi_{ik}$=Prob (Attribute k applied correctly to Item i given that the examinee has mastered Attribute k).

Interpretation of High Positivity. It is very desirable that items display high positivity. High positivity holds for an item when its r's are reasonably close to 0 and its $\pi$'s are reasonably close to 1. That is, with high probability an examinee applies the attributes required for the item according to the item/attribute incidence matrix correctly if and only if the examinee has mastered these attributes. For example, when high positivity holds, an examinee lacking at least one of the required attributes for the item is very likely to get the item wrong. Consider an item requiring Attributes 1 and 3 from the statistics test example. If, for instance, an examinee does not know how to interpret a histogram (Attribute 1), but the item requires correct calculation of the average by interpreting a histogram, the examinee is likely to get the item wrong, even if she has mastered averages (Attribute 3). Conversely, an examinee who has mastered both the required attributes is likely to get the item right, provided also that the $\theta+c$ is large indicating that the examinee likely will either use the (possibly many) required attributes needed for the item but excluded from the model correctly as well (i.e., the examinee's $\theta$ is large) or that the excluded attributes will play only a minor role (i.e., the item's c is large). Thus, if the calculation of the mean from the histogram is straightforward, for instance if the histogram is fairly standard and the calculation of the mean is uncomplicated, then an examinee who has mastered both calculation of averages (Attribute 3) and histograms (Attribute 1) will be likely to get the item right because the influence of attributes excluded from the model is minor and hence c will be large. In summary, a highly positive and reasonably complete item will be very informative about whether the examinee possesses all of its required attributes versus lacking at least one of them. This completes the description of the basic parameters of the probability model portion of the UM, that is of Block 209 of FIG. 2 and of FIG. 3. For further details concerning positivity, completeness, and the role of $\theta$, consult DiBello et al.

One of the most important and useful aspects of the UM, as contrasted with other IRT-based models, is that completeness and positivity provide a natural and parsimonious way to parameterize the random nature of cognitive examinee responding. It is relatively easy to explain to the user of the UM procedure what these two concepts mean and, moreover, to explain the details of how they are parameterized in the UM.

Inability to Calibrate the DiBello et al UM Blocks 211, 213, 215 could not be carried out in the 1995 DiBello et al paper because in particular Block 211 could not be carried out. This then precluded the two subsequent Blocks 213 and 215 from being able to be carried out. The failure to carry out Block 211 was because as of 1995 there were too many parameters in the UM equations compared with the size of a typical test data set in order to achieve acceptable UM model parameter calibration (recall that calibration simply means estimation of the parameters of the model using the available data). In particular it was impossible to estimate examinee attribute mastery versus nonmastery (Block 213) and then to use this to do cognitive diagnoses (Block 215) such as informing an examinee of which attributes need further study.

The above Described UM as Used in the Preferred Embodiment UMCD of the Present Invention (discussion below presented only for the cognitive diagnosis application; results are identical for the medical or psychiatric application). The construction of a test comprising test items and the selection of a set of attributes (Blocks 201 and 203) designed to measure examinee proficiency is common to the 1995 UM procedure and the UMCD of the present invention. The building of the item/attribute incidence matrix (Block 205) is common to the 1995 UM procedure and the UMCD of the present invention. The completeness component P ($\theta_j+c_i$) is common to the 1995 UM procedure and the UMCD of the present invention. That is, the selected attributes forming the incidence matrix being a subset of a larger group of attributes influencing examinee test item performance with the remainder of the larger group of attributes being accounted for in the UM by a residential ability parameter, namely completeness, is common to the 1995 UM procedure and the UMCD of the present invention. Positivity, namely the model including parameters describing how the test items depend on the selected set of attributes by accounting for a probability that each examinee for each individual test item may achieve mastery of all the attributes from the subset of the selected set of attributes required for the individual test item but fail to apply at least one such required and mastered attribute correctly to the individual test item thereby responding to the test item incorrectly is common to the 1995 UM procedure and the UMCD of the present invention. Similarly, and also part of the definition of positivity, each examinee for each individual test item may have failed to achieve mastery of at least one specified attribute required for the item and nevertheless apply these required specified attributes for which mastery was not achieved correctly to the item and also apply the remaining required and mastered attributes from the selected set of attributes correctly to the item thereby responding to the test item incorrectly. But the 1995 UM item parameters were not identifiable whereas the parameters of the UM of the present invention are. Also in common is the administering of the test (Block 207)

Other Prior Art: Probability Model-based Cognitive Diagnostic Procedures; Deterministic Procedures 1. Probability model-based procedures Most of the important IRT-based (and hence probability model-based) cognitive diagnosis procedures use a Bayesian formulation of a cognitive model and sometimes use a computational tool called Markov Chain Monte Carlo (MCMC) as the computational tool to calibrate them. The UM procedure presented, which forms a core of the present invention also has a Bayes probability model formulation and also uses MCMC. Thus Bayes modeling, MCMC computation, and needed related concepts are first explained before further presenting the other instances of prior art.

Calibration of a Statistical Model Consider the simple model y=ax, where a is an unknown parameter. Model calibration refers to the use of the available data, which is viewed as generated by the model, to statistically estimate the unknown model parameters. It must be understood that without calibration, probability models are useless for doing real world inference such as cognitive diagnosis. In particular, model calibration is necessary because the parametric model y=ax is of no use in carrying out the desired statistical inference of predicting y from x until the parameter a is calibrated (estimated) from real data. Thus if a=2 is an accurate estimate provided by the data, the now calibrated model y=2x is useful in predicting y from x, provided this simple straight line model does a relatively accurate (unbiased) job of describing the real world setting of interest.

The need for a new statistical modeling approach in complex, real-world settings A major practical problem often standing in the way of applicable statistical modeling of complex real world settings is that modeling realism demands correspondingly complex and hence many-parameter models while the amount of data available is often not sufficient to support reliable statistical inference based on such complex models with their many parameters. (The more parameters in a model, the greater the statistical uncertainty there is in the estimated (that is, calibrated) values of these parameters. Thus 400 data points produced little uncertainty in the estimation of the drug cure probability p in the one-parameter model of Example 1. But if there were instead 30 parameters in a problem where the number of data points is 400, then the level of uncertainty in the parameter estimates needed to calibrate the model will likely render the model almost useless for the desired statistical inference.

In many complex settings where appropriate statistical modeling and analysis is needed, an unacceptable dilemma exists. On the one hand, the limited data available can be used to well calibrate a biased model (an overly simplified model that distorts reality) because there is ample data to accurately estimate its relatively few parameters. For example estimating a=2 in the model y=ax is of no use for prediction if the reality is well described only by the more parametrically complex four-parameter model $y=c+ax+bx^2+dx^3$. On the other hand, suppose only poor calibration of the four parameters of this model that accurately portrays reality because there is not enough data to well estimate the four model parameters. To illustrate, if the true reality is $y=5+9x+12x^2+4x^3$, the model is poorly calibrated to be $y=3+4x+20x^2+2x^3$ using the limited available data, the calibration is so bad that the calibrated cubic polynomial model will be of no use for doing accurate prediction of y from x even though the reality is well described by a cubic polynomial model.

This dilemma of bad model with good calibration versus good model with bad calibration is a particular instance of what statisticians sometimes call the variance/bias tradeoff. Under either unacceptable modeling compromise, valid (i.e., using a relatively unbiased and relatively well calibrated model) inferences about the real world setting of interest are simply not possible.

Bayes Probability Modeling (a Practical Answer to Modeling Complex Real World Settings that Require Many Parameters) as a Major Statistical Modeling Technique Fortunately, recent developments in statistics offer a solution to the challenging dilemma of probability modeling of complex settings requiring relatively large numbers of parameters in their models. In particular, these developments apply to the probability modeling of the inherently complex cognitive diagnosis setting. Once a practitioner recasts parametrically complex statistical models as Bayes models, because of their newly acquired Bayesian nature they can be as well calibrated as if they have relatively few parameters and yet can accurately model complex settings. More specifically, this Bayesian modeling approach often allows circumventing the problem of a model being too parametrically complex to be reliably calibrated using available data. Indeed, in one of the major sources on Bayesian statistical analysis, Gelman, Carlin, Stern, and Rubin dramatically state (Gelman, A, Carlin, J, Stem, H, and Rubin, D., 1995, *Bayesian Data Analysis*. London, Chapman and Hall), "As we show in this chapter, it is often sensible to fit hierarchical (Bayesian) models with more parameters than there are data points". In particular, hierarchical Bayes modeling can be applied in IRT modeling of complex settings producing test data. An important paper by Richard Patz and Brian Junker, 1999,

*A Straightforward Approach to Markov Chain Monte Carlo Methods for Item Response Models*, Journal of Educational and Behavorial Statistics, 24, 146-178) effectively makes the case for the use of Bayes approaches when doing complex IRT modeling. More precisely, using a Bayesian model framework combined with straightforward MCMC computations to carry out the necessary Bayes calculations is highly effective for analyzing test data when complex IRT models are needed (Patz et al). This is precisely the invention's situation when trying to use test data to carry out cognitive diagnoses. Further, as suggested above, the UM incorporating an expertly crafted Bayesian approach has the potential to allow the full information locked in the test data to be extracted for cognitive diagnostic purposes.

Bayes Modeling Example Although the notion of a Bayes probability model is a complex and sophisticated concept, a simple example will clarify the basic idea of what a Bayes probability model is and how its statistical analysis proceeds.

Example 3: Example 1 (modified). Consider the drug trial setting of Example 1. Suppose that in addition to the data there is powerful prior scientific evidence that the true unknown p satisfies $0.5 \leq p \leq 0.9$ and, moreover, values of p in this range become more improbable the further they are away from a cure rate of 0.7. The Bayes approach quantifies such probabilistic knowledge possessed by the investigator about the likelihood of various values of the parameters of the model by assigning a prior probability distribution to the parameter p. That is, a Bayes model puts a probability distribution on the model's parameter(s), where this distribution reflects how likely the user believes (based on prior knowledge and/or previous experience) various values of the unknown parameter are likely to be. Suppose the prior distribution for p is given as a "density" in the FIG. 5.

For example, it can determined from FIG. 5:
Probability (0.7<p<0.8)=area between 0.7 and 0.8=0.4
Probability (0.8<p<0.9)=area between 0.8 and 0.9=0.1
Thus, although the lengths of the intervals (0.7, 0.8) and (0.8, 0.9) are identical, the probability of the unknown parameter p falling in the interval (0.7, 0.8) is much higher than the probability of the unknown parameter p falling in the interval (0.8, 0.9), a fact which will influence our use of the data to estimate p. More generally, the values of p become much more unlikely as p moves away from 0.7 towards either 0.5 or 0.9. Clearly, this prior distribution makes the estimated p much closer to 0.7 than the estimate that p=0.75 obtained when a Bayes approach is not taken (and hence p does not have a prior distribution to modify what the data alone suggests as the estimated value of p). The Bayes approach simply does not allow the data set to speak entirely for itself when it comes to estimating model parameters.

Converting an Ordinary Probability Model into a Bayes Probability Model It must be emphasized that converting an ordinary probability model with parameters into a Bayes probability model with prior distributions on the parameters amounts to developing a new probability model to extend the old non-Bayes probability model. Indeed, converting a non-Bayes model to a Bayes model is not rote or algorithmic but rather is more like "guild-knowledge" in that it requires knowledge of Bayes modeling and especially of the real world setting being modeled. Choosing an effective Bayes model can have a large influence on the accuracy of the statistical inference.

Choosing The Prior Distribution In many Bayes modeling applications, in particular the Bayes UM approach of the present invention, the choice of the prior distributions is carefully done to be informative about the parameters while not being over-informative in the sense of putting more weight on the prior information than is justified. For example in the Bayes example described previously, a somewhat less informative prior than that of FIG. 5 is given in FIG. 6, often called a vague prior because it is rather unobtrusive in its influence over the resulting statistical inference. In this case of a vague prior the inference that p=0.75 in the non-Bayes case is moved only slightly towards 0.7.

Finally, the prior of FIG. 7 is totally uninformative about the likely value of p.

As would be suspected, when a Bayesian approach is taken, the non-Bayesian inference in Example 1 that p=0.75 is in fact unaltered by the totally uninformative prior plotted above.

Example 3 Continued. Now the Bayes analysis of Example 3 using the triangular prior presented before is continued. Given this Bayes probability model and data that produced 75% cures, a Bayesian statistical analysis would estimate in a formal way as explained below that p=0.72 (instead of the non-Bayes estimate of 0.75). This is because, through the provided prior distribution, it is included in the inference process the fact that values of p like 0.75 are much less likely than values closer to 0.7. That is, the current Bayes estimate of p=0.72 resulted from combining the non-Bayesian analysis of the data from example 1 suggesting p=0.75 together with prior knowledge that a p as big as 0.75 is relatively unlikely compared to p closer to 0.7. The mathematically derived Bayes compromise between these two sources of information (prior and data-based) produces the compromise Bayes inference that p=0.72.

Basic Bayes Inference Paradigm: Schematic and Formula The flow chart of FIG. 8 shows the basic Bayes inference paradigm. As with all statistical procedures, it starts with observed data (Block 801 of FIG. 8).

Computationally, the Bayes inference paradigm is as follows. Let X denote the observed data (Block 801) and $\omega$ denote parameters $\omega$ of the Bayes model. Block 807 indicates the Bayes probability model, which is the combination of the prior distribution $f(\omega)$ on the model parameters (Block 803) and the likelihood probabililty distribution $f(X|\omega)$ (Block 805). Note that both X and $\omega$ are likely to be high dimensional in practice. Then the posterior distribution of parameters (indicated in Block 809) given the data is computed as follows $$f(\omega|X) = \frac{f(X|\omega)f(\omega)}{\int f(X|\omega)f(\omega)d\omega}$$

Here, $f(\omega) \geq 0$ is the prior distribution ($f(\omega)$ referred to as a density) on the parameters specially created for the Bayes model. The choice of the prior is up to the Bayes practitioner and is indicated in Block 803. Also, in Equation 4, $f(X|\omega)$ is the usual likelihood probability distribution (see Block 805; the notion of a likelihood explained below) that is also at the heart of a non Bayesian statistical inference about $\omega$ for observed data X The prior distribution on the parameters and the likelihood probability distribution together constitute the Bayes probability model (Block 807). The likelihood probability distribution $f(X|\omega) \geq 0$ tells that the random mechanism by which each particular parameter value co produces the observed data X, whereas the prior distribution $f(\omega)$ tells how likely the practitioner believes each of the various parameter values is.

In Equation 4, $f(\omega|X)$ denotes the posterior probability distribution of $\omega$ when the data X has occurred. It is "posterior" because it is the distribution of to as modified from the prior by the observed data X (posterior to X). All Bayesian statistical inferences are based on obtaining the posterior distribution $f(\omega|X)$ via Equation 4, as indicated in Block 811. For example, the inference that p=0.72 in Example 3 was the result of finding the value of p that maximizes the posterior f(p|30 cures out of 40 trials).

A key point in actually carrying out a Bayesian analysis is that computing the integral in the denominator of Equation 4 when $\omega$ is high dimensional (that is, there are many model parameters) is often difficult to impossible, in which case doing a Bayesian inference is also difficult to impossible. Solving this computational issue will be seen to be important for doing cognitive diagnoses for test data X when using a Bayesian version of the UM in the present invention.

Bayesian Statistical Methods Using Markov Chain Monte Carlo The use of complex Bayes models with many parameters has become a reasonable foundation for practical statistical inference because of the rapidly maturing MCMC simulation-based computational approach. MCMC is an excellent computational tool to statistically analyze data sets assumed to have been produced by such Bayes models because it allows bypassing computing the complicated posterior distribution of the parameters (Equation 4) required in analytical computational approaches. In particular, the specific MCMC algorithm used in the invention (see the Description of the Preferred Embodiments section), namely the Metropolis-Hastings within Gibbs-sampling algorithm, allows bypassing computing the complex integral in the denominator (see Equation 4) of typical Bayesian approaches (via the Metropolis-Hastings algorithm) and simplifies computing the numerator (see Equation 4) of typical Bayesian approaches (via the Gibbs sampling algorithm). Before the advent of MCMC, complex Bayes models were usually only useful in theory, regardless of whether the practitioner took a non-Bayesian or a Bayesian approach.

Currently the most viable way to do cognitive diagnoses using examinee test response data and complex Bayes modeling of such data is to analyze the data using a MCMC (see Chapter 11 of Gelman et al )for a good description of the value of MCMC in Bayesian statistical inference) computational simulation algorithm. Once a Bayesian statistical model has been developed for the specific setting being modeled, it is tedious but relatively routine to develop an effective MCMC computational procedure to obtain the posterior distribution of the parameters given the data. An attractive aspect of Bayes inference is that the computed posterior distribution provides both model calibration of unknown parameters and the backbone of whatever inference is being carried out, such as cognitive diagnoses concerning attribute mastery and non-mastery. Excellent general references for MCMC computation of Bayes models are Gelman et al and Gilks, W.; Richardson, S.; Spiegelhalter, D. (1996) *Markov Chain Monte*

*Carlo in Practice*. Boca Raton. Chapman & Hall/CRC. A reference for using MCMC computation of Bayes IRT models (the Bayes UM belonging to the IRT family of models) is Patz et al. Indeed, as the Patz et al title, "*A Straightforward Approach to Markov Chain Monte Carlo Methods for Item Response Theory Models*", suggests, the development and use of MCMC for Bayes IRT models is accessible for IRT and educational measurement, assuming the Bayes IRT model has been constructed.

Likelihood-Based Statistical Inference Before understanding the computational role of MCMC it is necessary to understand how a Bayesian inference is computationally carried out. This in turn requires understanding how a likelihood-based inference is computationally carried out, which is explained now. A core concept in statistics is that, given a specific data set, often a maximum likelihood (ML) approach to parameter estimation is taken. Basically, this means that the value of a model parameter is inferred to be in fact the value that is most probable to have produced the observed data set. In statistical modeling, the fundamental assumption is that the given model has produced the observed data, for some specific value(s) of its parameter(s). This idea is simple, as the following illustration shows. If 75% cures is observed in the medical data Example 1 above, then a theoretical cure rate (probability) of p=0.2 is extremely unlikely to have produced such a high cure rate in the data, and similarly, p=0.97 is also extremely unlikely to have produced such a relatively low cure rate in the data. By contrast to this informal reasoning, using elementary calculus, it can be shown that p=0.75 is the value of the unknown parameter most likely to have produced a 75% cure rate in the data. This statistical estimate that p=0.75 is a simple example of maximum likelihood-based inference.

The heart of a likelihood-based inference is a function describing for each possible value of the parameter being estimated how likely the data was to have been produced by that value. The value of the parameter that maximizes this likelihood function or likelihood probability distribution (which is $f(X|\omega)$ in the Bayes Equation 4 above) then becomes its maximum likelihood estimate. $f(X|\omega)$ is best thought of as the probability distribution for the given parameter(s) $\omega$. For example the likelihood function for 30 cures out of 40 trials is given in FIG. 9, showing that p=0.75 indeed maximizes the likelihood function and is hence the maximum likelihood estimate of p.

Bayesian Likelihood Based Statistical Inference This is merely likelihood-based inference as modified by the prior belief or information (as expressed by the prior probability distribution, examples of such a prior shown in FIGS. 5, 6, and 7) of the likelihood of various parameter values, as illustrated in FIG. 10. "Prior" refers to information available before (and in addition to) information coming from the collected data itself. In particular, the posterior probability distribution is the function showing the Bayes likelihood distribution of a parameter resulting from "merging" the likelihood function for the actually observed data and the Bayes prior. For instance, in Example 3 with the triangular prior distribution for p of FIG. 5 as before, FIG. 10 simultaneously shows the likelihood function for p, the triangular prior for p, and the Bayes posterior distribution (also called the Bayes likelihood distribution) for p resulting from this prior and having observed 30 cures out of 40 trials in the data. Recall that equation 4 gives a formula for the needed posterior distribution function for a given prior and likelihood probability function. Note from the posterior distribution in FIG. 10 that the estimate of p obtained by maximizing the posterior distribution is approximately 0.72 as opposed to 0.75 that results from using the maximum likelihood estimate that maximizes the likelihood function.

The Intractability of Computing the Posterior Distribution in Complex Bayesian Statistical Analyses as Solved by MCMC As already stated, there is often an enormous practical problem in computing the posterior distribution in complex Bayesian analyses. For most complex Bayes problems, the computation needed to produce the required posterior distribution of how likely the various possible values of the unknown parameters are involves an intractable multiple integral that is simply far too complex for direct computation, even with the high speed computing currently available.

In particular, MCMC is a tool to simulate the posterior distribution needed to carry out a Bayesian inference in many otherwise intractable Bayesian problems. In science and technology, a "simulation" is something that substitutes for direct observation of the real thing; in our situation the substitution is for the direct computation of the Bayes posterior distribution. Then, by observing the results of the simulation it is possible to approximate the results from direct observation of the real thing.

To illustrate the idea of Monte Carlo simulation in action, let's consider a simple simulation approach to evaluating very simple integral, which can in fact be easily done directly using elementary calculus.

Example 4. Evaluate $\int x\, e^{-x} dx$, the integral over the range $0<x<\infty$. This integral is solved by simulating a very large number of independent observations x from the exponential probability density $f(x)=e^{-x}$ (shown in FIG. 11). Then the average for this simulated data is computed.

Because of the fundamental statistical law of large numbers (e.g., a fair coin comes up heads about ½ of the time if we toss it a large number of times), this data produced average will be close to the theoretical exponential density mean (first moment or center of gravity of f(x)) given by the integral. For example, if five simulated numbers are 0.5, 1.4, 2.2, 0.9 and 0.6 then we estimate the integral to be the average of the simulated numbers, 1.12, whereas the integral's computed value is 1. Of course, if high accuracy were required, then it would be desirable to do 100, 400, or even 1000 simulations, rather than five. Thus this Monte Carlo approach allows accurate evaluation of the unknown integral without any theoretical computation required.

But for complex, many-parameter, Bayes models, this independent replications Monte Carlo simulation approach usually fails to be practical. As a viable alternative, MCMC simulation may be used, thereby avoiding the complex intractable integral needed to solve for the posterior distribution in a Bayes statistical analysis. In particular, MCMC simulation estimates the posterior distribution of several statistical cognitive diagnostic models. Each such MCMC uses as input the Bayesian structure of the model (UM or other) and the observed data, as the basic Bayes formula of Equation 4. Recall that the Bayesian structure of the model refers to the prior distribution and the likelihood probability distribution together Non-UM Prior Art Examples Now that the necessary conceptual background of statistical concepts and data computational techniques (especially Bayes probability modeling and MCMC) have been explained and illustrated, the relevant prior art is described (in addition to the UM), consisting of certain other proposed or implemented cognitive diagnostic procedures.

Four non-UM model based statistical cognitive approaches are described (that is, the methods are based on a probability model for examinee responding to test items) that can do cognitive diagnosis using simply scored test data. These seem to be the main statistical approaches that have been developed to the point of actually being applied. It is significant to note that only Robert Mislevy's approach seems to have been placed in the commercial arena, and then only for complex and very specialized applications (such as dental hygienist training) based on complex item types rather distinct from the cognitive diagnosis of simple right/wrong scored test items. The four approaches are:
1. Robert Mislevy's Bayes net evidence-centered approach
2. Kikumi Tatsuoka's Rule-space approach
3. Susan Embretson's Generalized Latent Trait Model (GLTM)
4. Brian Junker's Discretised GLTM Robert Mislevy's Bayes Net Approach The Bayes net approach is considered first. Two excellent references are Mislevy, R, 1995, Probability based inference in cognitive diagnosis. In Nichols, et at. *Cognitively Diagnostic Assessment*. Mahway, N.J., Lawrence Erlbaum and Mislevy, Robert and Patz, Richard, 1998, Bayes nets in educational assessment: where the numbers come from. Educational Testing Company technical report; Princeton N.J. Like the Bayes UM approach of the invention (see the Description of the Preferred Embodiments section), this is a Bayesian model based statistical method. Although usually applied in settings other than those where the primary data is simply scored (such as items scored right or wrong) examinee responses to ordinary test questions, it can be applied in such settings, as shown in the research reported in Section 5 of Mislevy et al. Crucially, although it does assume latent attributes, as does the UM, it does not use the concepts of item/attribute positivity or incompleteness (and hence the Bayes net approach does not introduce θ to deal with incompleteness) that the Bayes UM of the invention uses. The model simplifying role played by θ and the positivity parameters π's and r's in UM methodology, thus making the UM model used in the invention tractable, is instead replaced in the Bayes net approach by graph-theoretic techniques to reduce the parametric complexity of the Bayes net's probability tree of conditional probabilities linking latent attribute mastery states with examinee responses to items. These techniques are in fact difficult for a non graph-theoretic expert (as is true of most cognitive diagnostic users) to use effectively.

The Educational Testing Service (ETS) is commercially marketing the Bayes net technology under the name Portal, and indeed have used Portal in the training of dental hygienists. But this approach is not easy for practitioners to be able to use on their own, for reasons already stated. In particular, exporting the approach for reliably independent use outside of ETS has been difficult and requires serious training of the user, unlike the Bayes UM methodology of the present invention. Further, it may not have the statistical inference power that the present UM invention possesses, especially because of the important role played by each of positivity, incompleteness with the introduction of θ, and the positive correlational structure that the Bayes UM of the present invention places on the attributes (the importance of which is explained below in the Description of the Preferred Embodiments section). A schematic of the Bayes net approach is shown in FIG. 12. It should be noted that Blocks 201, 203, and 207 of the Bayes net of FIG. 12 approach are in common with the DiBello et al 1995 approach (recall FIG. 2). Block 1201 is just Block 807 of FIG. 8 of the genereal Bayes inference approach specialized to the Bayes net model. Similarly Block 1203 is a special case of computing the Bayes posterior (Block 809 of FIG. 8), in fact using MCMC. Finally the cognitive diagnostic step (Block 1205) is just a special case of the Bayes inference step (Block 811). Kikumi Tatsuoka's Rule Space Approach Two good references are Tatsuoka, K., 1983, Rule space; an approach for dealing with misconceptions based upon item response theory. Psychometrika 20, 34-38, and Tatsuoka, Kikumi, 1990, Toward an integration of item response theory and cognitive error diagnosis. Chapter 18 in *Diagnostic Monitoring of Skill and Knowledge Acquisition*. Mahwah, N.J., Lawrence Erlbaum. A schematic of the Rule Space approach is shown in FIG. 13. The rule space model for the randomness of examinee responding for each possible attribute vector structure is in some ways more primitive and is much different than the Bayes UM of the present invention. It is based entirely on a probability model of random examinee errors, called "slips" by Tatusoka. Thus the concept of completeness is absent and the concept of positivity is expressed entirely as the possibility of slips (mental glitches). The computational approach taken is typically Bayesian. Its fundamental idea is that an actual response to the test items should be like the "ideal" production rule based deterministic response (called the ideal response pattern) dictated by the item/attribute incidence matrix and the examinee's true cognitive state as characterized by his/her attribute vector, except for random slips. Cognitive diagnosis is accomplished by an actual examinee response pattern being assigned to the "closest" ideal response pattern via a simple Bayesian approach. Thus the rule space approach is basically a pattern recognition approach. A rule space cognitive diagnosis is computationally accomplished by a complex dimensionality reduction of the n dimensional response space (because there are n items) to the two dimensional "rule space" (see Block 1303 and the two Tatsuoka references for details). This produces a two dimensional Bayesian model (Block 1301, which is analogous to the general Bayes model building Block 807 of FIG. 8) This reduction to the low dimensional "two space" allows one to directly carry out the needed Bayes computation (see Block 1305) without having to resort to MCMC. Then the attribute state that $\underline{\alpha}$ that best predicts the assigned ideal response pattern is inferred to be the examinee's cognitive state, thus providing a cognitive diagnosis. This approach has no completeness, no positivity, no positive correlational structure imposed on the attributes, and its probability of slips distribution is based on some assumptions that seem somewhat unrealistic. In particular, the Bayes UM approach of the present invention should outperform the Rule-space approach for the above reasons. The two approaches are very distinct both in their probability models for examinee response behavior and in the Bayes calibration and diagnostic algorithm used. It should be noted that Blocks 201, 203, 205, and 207 are in common between the DiBello et al 1995 UM approach and the Rule-space approach. As with all cognitive diagnostic approaches, the last block, here Block 1307, is to carry out the actual cognitive diagnosis.

Susan Embretson's Generalized Latent Trait Model (GLTM) Two good references are Chapter 11 of Susan Embretson's, 2000, book *Item Response Theory for Psychologists*, Erlbaum, N.J., and Embretson, Susan, 1997, Multicomponential response models Chapter 18 in *Handbook of Modern Item Response Theory*, Edited by van der Linden and Hambleton, N.Y., Springer. This approach is distinct from the Bayes UM of the present invention. It assumes that the attributes to be inferred are continuous rather than binary (0/1) as is assumed in the Bayes UM, and it has no incompleteness component and no positive correlational attribute structure. Because it treats attributes as continuous, it tends to be applied to continuous latent abilities like "working memory" capacity and time until task completion. It uses, at least in its published descriptions, a computational approach called the EM algorithm, and thus the GLTM model is not recast in a Bayesian framework. Although in principle applicable to ordinary simply scored test data, that does not seem to be its primary focus of application. A schematic of the GLTM is shown in FIG. 14. Block 1401 is similar to Block 201 of FIG. 2, except here the attributes are continuous. Blocks 203 and 207 are in common with the other prior art procedures. Block 1405 is analogous to the FIG. 2 UM Block 209, Block 1405 is analogous to the FIG. 2 UM Block 213, and finally in common with all procedures, the last Block 1407 is the carrying out of a cognitive diagnosis.

Brian Junker's Discrete (0/1) Version of GTLM The idea is to replace Embretson's continuous latent attributes in her GTLM model by binary ones and keep the general structure of the model the same. A good reference is Junker, Brian, 2001, On the interplay between nonparametric and parametric IRT, with some thoughts about the future, Chapter 14 in *Essays on Item Response Theory*, Edited by A. Boomsma et al., New York, Springer. Perhaps a primary distinction between this new approach and the Bayes UM approach of the present invention is that Discrete GTLM does not have an incompleteness component. Further, it has no positive correlational attribute structure. Finally its positivity structure is much simpler than the Bayes UM of the present invention in that for Discrete GTLM the degree of positivity of an attribute is not allowed to depend on which test item is being solved. The computational approach for Discrete GTLM is MCMC.

Only contrasting flow diagrams have been provided for the first three statistical procedures just described (the Junker Discrete GTLM being almost identical to the Embretson GTLM schematic).

The most fundamental difference between various prior art approaches and the present invention is always that the model is different, although there are other distinguishing characteristics too.

2. Deterministic Cognitive Model Based Procedures There are numerous approaches that use a deterministic cognitive diagnosis approach. The statistical approaches are by their statistical nature superior to any deterministic approaches (that is, rule-based, data mining, artificial intelligence, expert systems, AI, neural-net based, etc.). All deterministic approaches have no deep and valid method for avoiding overfitting the data and thus erroneously conclude attribute masteries and non-masteries where in fact the supporting evidence for such conclusions is weak Further, these deterministic approaches all have models that are parametrically far too complex to support model calibration using ordinary simply scored test-data. These models are numerous in number and are simply too far afield to be useful for cognitive diagnosis in the simple test data environment.

Part 3. Prior Art in the Medical and Psychiatric Area Above, only the educationally oriented cognitive diagnostic setting has been considered. But, cognitively diagnosing an examinee based on the performance on observed items and medically diagnosing a patient have a similar structure. In both the attempt is to measure a latent state (attribute or medical/psychiatric disorder, simply referred to as a "disorder" below) based on observed information that is related to the latent state. In order to make inferences about a particular attribute or disorder, it is also important to understand the state of the person in terms of other attributes or disorders. In particular, in medicine and psychiatry, the goal of diagnostic tools is to provide the practitioner with a short list of disorders that seem plausible as a result of the observed symptoms and personal characteristics (such as gender, ethnicity, age, etc.) of the patient. Specifically, Bayesian posterior probabilities assigned to the set of disorders is analogous to assigning a set of posterior probabilities to a set of cognitive attributes. Although probability modeling approaches have been attempted in medicine and psychiatry, probability-based IRT models have not been attempted.

Next we list medical and psychiatric diagnostic prior art instances that have a probabilistic flavor.

Bayesian Network Based Systems A Bayesian Network for medical diagnostics represents the probabilistic relationship between disorders and symptoms/characteristics in a graph that joins nodes that are probabilistically dependent on one another with connecting lines. A good general reference is Herskovits, E. and Cooper, G., 1991, *Algorithms for Bayesian belief-network precomputation*, Meth. Inf. Med, 30, 81-89. A directed graph is created by the Bayes net modeling specialist and leads from the initial set of nodes that represent the set of disorders through an optional set of intermediate nodes to the resulting observed set of symptoms/characteristics. Given a patient's particular set of observed symptoms/characteristics, the posterior probability of having a certain disorder is calculated using the Bayes approach of Equation 4 and possibly MCMC. Here a prior distribution has been assigned to the proposed set of possible disorders, and specifying the conditional probabilities for each node given a predecessor node in the graph specifies the needed likelihood function of Equation 4. In this manner each line of the graph has a conditional probability associated with it. Medical applications of Bayesian Networks originally obtained the required numerical values for the conditional probabilities by consulting the appropriate medical literature, consulting available large data sets, or using expert opinion. Now, estimation techniques for obtaining these conditional probabilities have recently been developed. Even though the ability to estimate the conditional probabilities is important for the Bayesian Networks to work, the major impediment remains that many model-simplifying assumptions need to be made in order to make the network statistically tractable, as explained above in the discussion of the Bayes net prior art approach to cognitive diagnosis.

Neural Network and Fuzzy Set Theory Based Systems Both Neural Networks and Fuzzy Set Theory based approaches are graphical networks that design the probability relationships between the symptoms/characteristics and disorders via using networks and then do extensive training using large data sets. The networks are less rigidly specified in Neural Networks and in Fuzzy Set Theory based networks than in Bayesian Networks. The training of the networks essentially compares many models that are calibrated by the training process to find one that fits reasonably well. Fuzzy Set Theory techniques allow for random error to be built into the system. Neural Networks may also build in random error as well, just not in the formal way Fuzzy Set Theory does. Both systems have certain problems that result from the great freedom in the training phase: over/undertraining, determining the cases (data) to use for training because the more complex the model the more cases needed, determining the number of nodes, and the accessibility of appropriate data sets that will generalize well. This approach is very distinct from the UM specified model parametric approach. Good references are Berman, I. and Miller, R., 1991, *Problem Area Formation as an Element of Computer Aided Diagnosis: A Comparison of Two Strategies within Quick Medical Reference* Meth. Inf. Med., 30, 90-95 for neural nets and Adlassnig, K., 1986, *Fuzzy Set Theory in Medical Diagnosis*, IEEE Trans Syst Man Cybernet, SMC-16:260-265.

Deterministic Systems Two deterministic approaches used are Branching Logic Systems and Heuristic Reasoning Systems. As discussed above in the cognitive diagnostic prior art portion, all deterministic systems have drawbacks in comparison with probability model based approaches like the UM.

SUMMARY OF THE INVENTION

The present invention does diagnosis of unknown states of objects (usually people) based on dichotomizable data generated by the objects. Applications of the present invention include, but is not limited to, (1) cognitive diagnosis of student test data in classroom instructional settings, for purposes such as assessing individual and course-wide student cognitive progress to be used such as in guiding instruction-based remediation/intervention targeted to address detected cognitive deficits, (2) cognitive diagnosis of student test data in computerized instructional settings such as web-based course delivery systems, for purposes such as assessing individual and course-wide cognitive progress to be used such as to guide computer interactive remediation/intervention that addresses detected cognitive deficits, (3) cognitive diagnosis of large-scale standardized tests, thus assessing cognitively defined group-based cognitive profiles for purposes such as evaluating a school district's instructional effectiveness, and providing cognitive profiles as feedback to individual examinees, and (4) medical and psychiatric diagnosis of medical and mental disorders for purposes such as individual patient/client diagnosis, treatment intervention, and research.

In addition to doing cognitive or other diagnosis in the settings listed above, the scope of application of the present invention includes the diagnosis of any latent (not directly observable) structure (possessed by a population of individual objects, usually humans) using any test-like observed data (that is, multiple dichotomizably scored pieces of data from each object such as the recording of multiple questions scored right/wrong observed for each test taker) that is probabilistically controlled by the latent structure as modeled by the UM. To illustrate, attitude questionnaire data might be diagnosed using the present invention to infer for each of the respondees certain attributes such as social liberal vs. conservative, fiscal liberal vs. conservative, etc.

Terminology Defined

Attribute. Any latent mental capacity that influences observable mental functioning Items Questions on a test whose examinee responses can be encoded as correct or incorrect Residual Ability Parameter. A low dimensional (certainly not greater than 6, often unidimensional) set of quantities that together summarize examinee proficiency on the remainder of the larger group of attributes influencing examinee performance on items Dichotomously scored probe. Analogous to an item in the cognitive diagnosis setting. Anything that produces a two valued response from the object being evaluated Objects. Analogous to examinees in the cognitive diagnostic setting. Any set of entities being diagnosed Association. Any relationship between two variables such as attributes where the value of one variable being larger makes the other variable probabilistically tend to be larger (positive association) or smaller (negative association). Correlation is a common way of quantifying association.

Unobservable dichotomized properties. Analogous to attributes in cognitive diagnostic setting. Any property of objects that is not observable but either has two states or can be encoded as having two states, one referred to as possessing the property and the other as not possessing the property.

Applying property appropriately means enhancing the chance of a positive response to the probes dependent on the property.

Symptoms/characteristics. Analogous to items in the cognitive diagnostic setting. Observable aspects of a patient in a medical or psychiatric setting. Can be evident like gender or the symptom of a sore throat, or can be the result of a medical test or question put to the patient. In current UM applications needs to be dichotomizable Health or Quality of Life parameter. Analogous to the summary of the remaining attributes given by $\theta$ in the cognitive diagnostic setting. A general and broad indicator of a patient's state of medical well being separate from the specified disorders listed in the UM medical diagnostic application.

Disorder. Any medical or psychiatric condition that is latent, and hence needs to be diagnosed, and constitutes the patient being unwell in some regard.

Probe. Analogous to an item in the cognitive diagnostic setting. Something that brings about a two-valued response from an object being diagnosed.

Positive or negative response to a probe. Analogous to getting an item correct or incorrect in the cognitive diagnostic setting. Positive and negative are merely labels given to the two possible responses to a probe, noting that sometimes a "positive" response is contextually meaningful and sometimes it isn't.

BRIEF DESCRIPTION OF THE DRAWINGS

FIG. 18 displays a page of the introductory statistics exam to illustrate items simulated in the UMCD demonstration example.

FIG. 19 displays an item/attribute incidence matrix for the introductory statistics exam simulated in the UMCD demonstration example.

DESCRIPTION OF THE PREFERRED EMBODIMENTS

Figure 1:
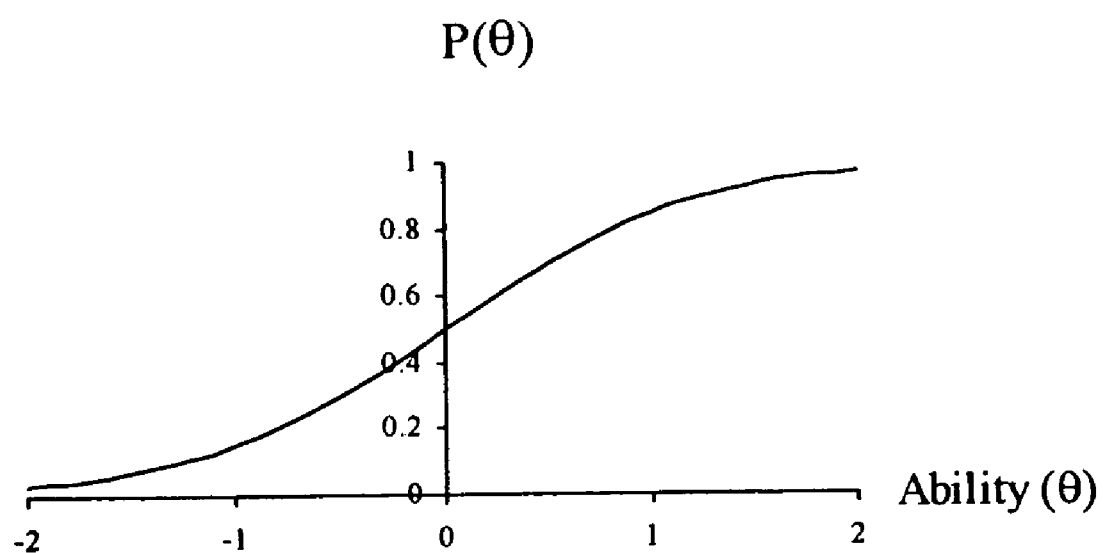
FIG. 1 shows the standard logistic item response function $P(\theta)$ used as the basic building block of IRT models in general and in the UM in particular.

The present invention is based in part on discoveries of failings of the 1995 DiBello et al UM proposed approach. These were overparameterization that caused parameter nonidentifiability, the failure to set mastery levels that also was a further cause of nonidentifiability and raised substantive issues of interpretation for the user, the lack of a practical and effective calibration procedure, and a failure to model the natural positive correlational structure existing between attributes to thereby improve cognitive diagnostic accuracy. These failings are discussed first. To do so, more must be understood about parameterization and identifiability.

Nonidentifiability and Model Reparameterization in Statistical Modeling In statistical modeling, a model with fewer parameters that describes reality reasonably well is much preferred to a model with more parameters that describes reality at best a bit better. This is especially important if the model with more parameters has nonidentifiable parameters, namely parameters that statistically cannot be separated from one another, that is parameters that cannot be estimated at all from the data. A trivial example illustrates the important ideas of nonidentifiability and the need for reparameterization. Consider the model y=a+bx+cx. This model has three parameters a, b, c. But the model is over-parameterized in that b and c play exactly the same role (a parameter multiplying the variable x) and hence cannot be statistically distinguished from each other. Thus the model parameters b and c are nonidentifiable and cannot be estimated from available data. The two parameter model y=a+bx is superior because it has one less parameter, all its parameters are identifiable, and it describes reality just as well. With the present invention the not-useful and non-identifiable 1995 UM was reparameterized by reducing the number of parameters through the introduction of a smaller yet substantively meaningful set of parameters and through specifying attribute mastery levels, thereby producing all identifiable, and hence estimable, parameters.

The General Approach to Reparameterization Assume a model with a meaningful set of K parameters; i.e., the parameters have useful real-world substantive interpretations (like velocity, mass, acceleration, etc., do in physics models). The general method is for k<K to define new and meaningful parameters $a_1, a_2, \ldots, a_k$, each a being a different function of the original set of K parameters. It is desirable to choose the functions so that the new set of parameters are both identifiable and substantively meaningful. A valid reparameterization is not unique and there thus exist many useful and valid reparameterizations.

Now consider the nonidentifiability in the 1995 UM.

Sources of Nonidentifiability in the Prior Art 1995 UM of DiBello et al.: Failure to Paramerization Parsimoniously and Failure to Specify Mastery Levels It has been discovered that the source of the nonidentifiabililty was twofold. First, the number of parameters had to be reduced by a substantively meaningful reparameterization using the general approach explained above.

Second, it was discovered that it is necessary as part of the model to specify the mastery level for each attribute in the model. Essentially, specifying the mastery level defines how proficient an examinee must be in applying an attribute to items in order to be classified as having mastered the attribute. This mastery specification is needed not only to achieve identifiability but also is required so that users are empowered to draw substantively meaningful conclusions from the UM cognitive diagnoses. Indeed, it is a meaningless claim to declare an examinee a master of an attribute unless the user knows what attribute mastery actually means in the context of the test items that make up the test. Thus, any cognitive diagnostic model that fails to somehow set mastery levels has a fundamental flaw that will cause serious malfunctioning.

Failure to Use the Positive Correlational Structure of Attributes in 1995 UM Another problem discovered with the 1995 UM was that much of the information about the association between attributes available in examinee data was not being taken advantage of, a flaw correctable by carefully recasting the model as a Bayesian model. Of course, other ways to also capture much of the available information may be found in the future, rendering Bayes modeling not the only choice.

The result of dealing effectively with these discoveries (overparameterization, lack of mastery specification, failure to use attribute positive associational structure) is a practical and powerful cognitive diagnostic procedure that can be applied to actual test data to produce actual cognitive diagnoses for examinees taking the test, namely the UMCD of the present invention.

Failure to Achieve Calibration of the 1995 UM Just as fundamental to the development of a useful UM-based cognitive diagnostic procedure, was finding a useful calibration procedure. In fact, calibration of the model had not been accomplished in DiBello et al. Both the nonidentifiabililty and the non-Bayesian character of the model were barriers to calibration. Not achieving such calibration had precluded doing effective cognitive diagnosis. The recent popularization of the new data computational MCMC approach allows the calibration of Bayes models, even when the models are parametrically very complex. This suggested that recasting the 1995 UM as a Bayes Model was a viable strategy for achieving effective calibration of the model. Again, it must be made clear that without calibration, cognitive diagnosis is impossible no matter how realistic the model is. For example, the illustration of a simulated UM-based cognitive diagnosis presented in DiBello et al was achieved only by pretending that the UM had been calibrated, contrary to what was statistically possible at the time of the publication of the paper. Thus cognitive diagnosis using the 1995 UM was not possible at the time of its publication and indeed was not possible until the Bayes UM of the present invention with identified parameters and mastery specified was developed and its computational MCMC based model calibration.

Now the developed reparameterization that is used in the UMCD of the present invention is discussed.

The Reparameterization Used to Replace the Overparameterization of the 1995 UM In particular, a reparameterization of the non-Bayesian UM as it was published in DiBello et al to make the parameters "identifiable" was necessary (Equation 5 below). In particular, it was realized that reparameterization of the 1995 UM was required for adequate cognitive diagnosis. That is, the original parameters that were redundant in the UM had to be replaced, even though substantively they had meaningful interpretations. (A non-Bayes UM reparameterization is conceptually analogous to replacing the nonidentifiable overparameterized model y=a+bx+cx by the simpler and not over parameterized identifiable model y=a+bx, as presented above.)

Moreover, the reparameterization had to result in identifiable parameters that "made sense" by being easily understood by actual practitioners. The particular choice of reparameterization, as explained below, seems to be an essential reason why the UM procedure works well in applications and is easy for users to understand and interpret.

Figure 3:
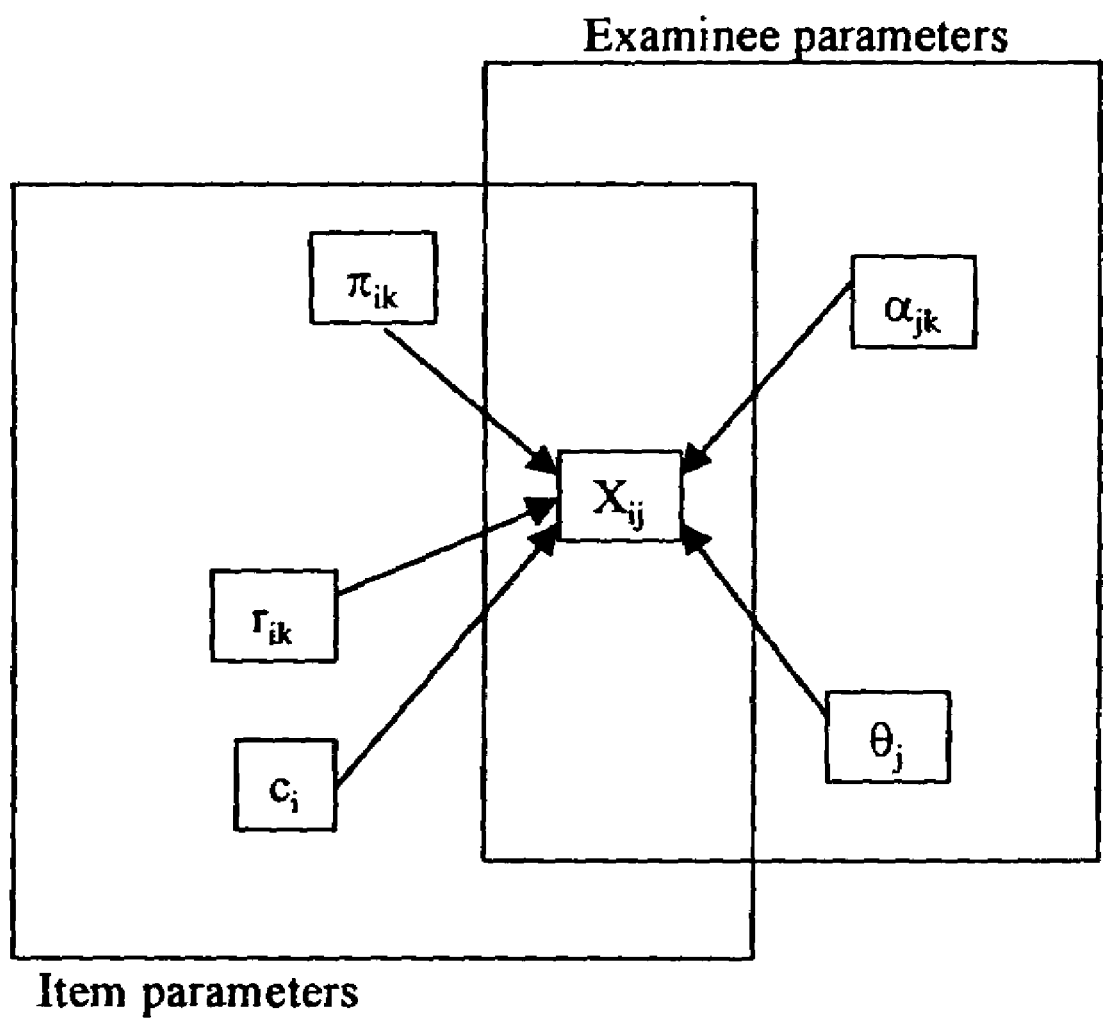
FIG. 3 displays a schematic of the 1995 UM probability model for the random response $X_{ij}$ of one examinee to one item, indicating the examinee parameters and item parameters influencing the examinee response $X_{ij}$.
Figure 4:
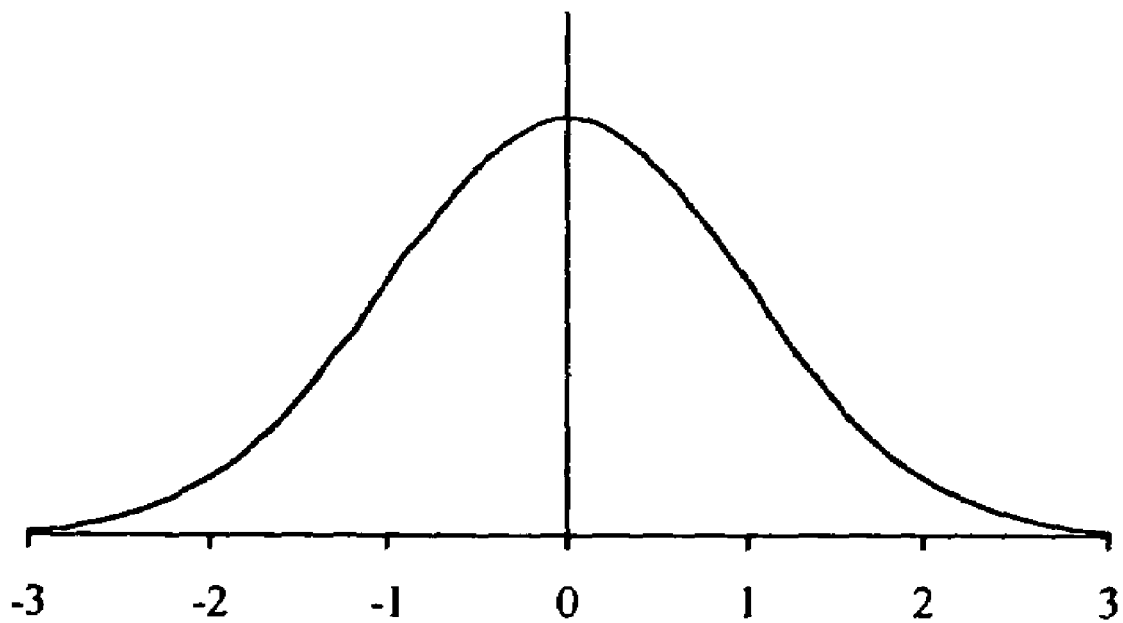
FIG. 4 displays the standard normal probability density function assumed for the distribution of examinee residual ability $\theta$ in the UM.
Figure 5:
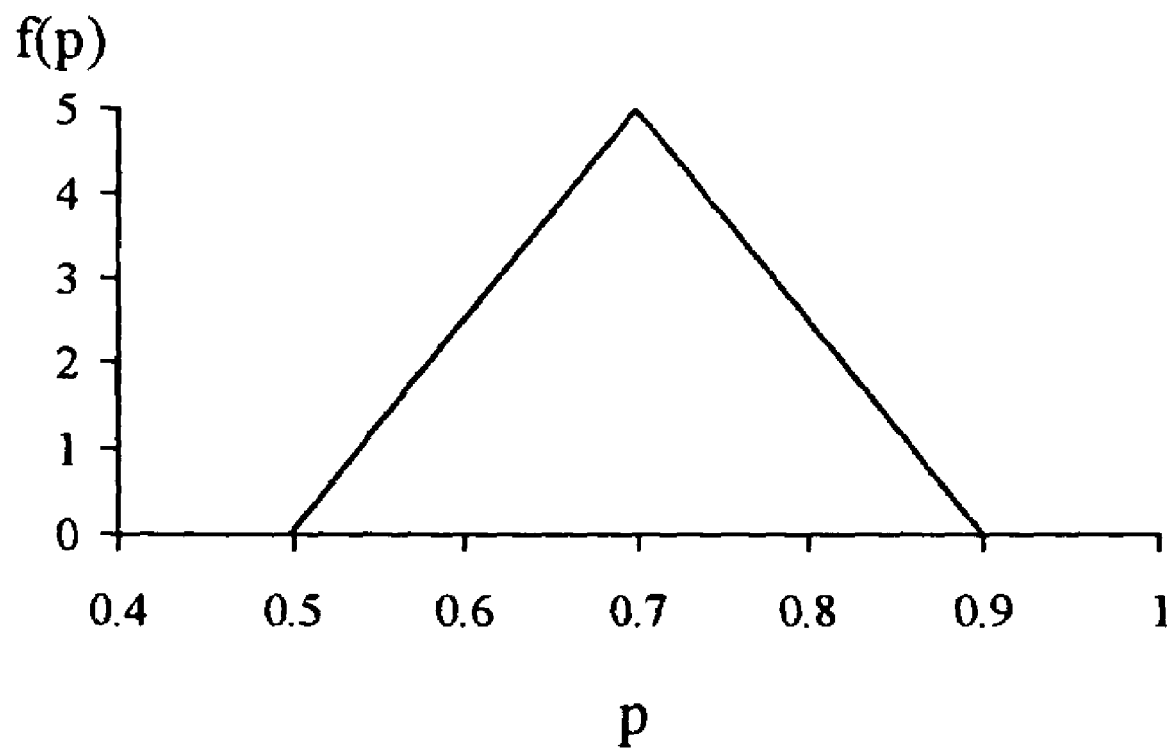
FIG. 5 displays an informative triangular prior density $f(p)$ for the parameter p=Prob(cure) in a statistical drug trial study.
Figure 6:
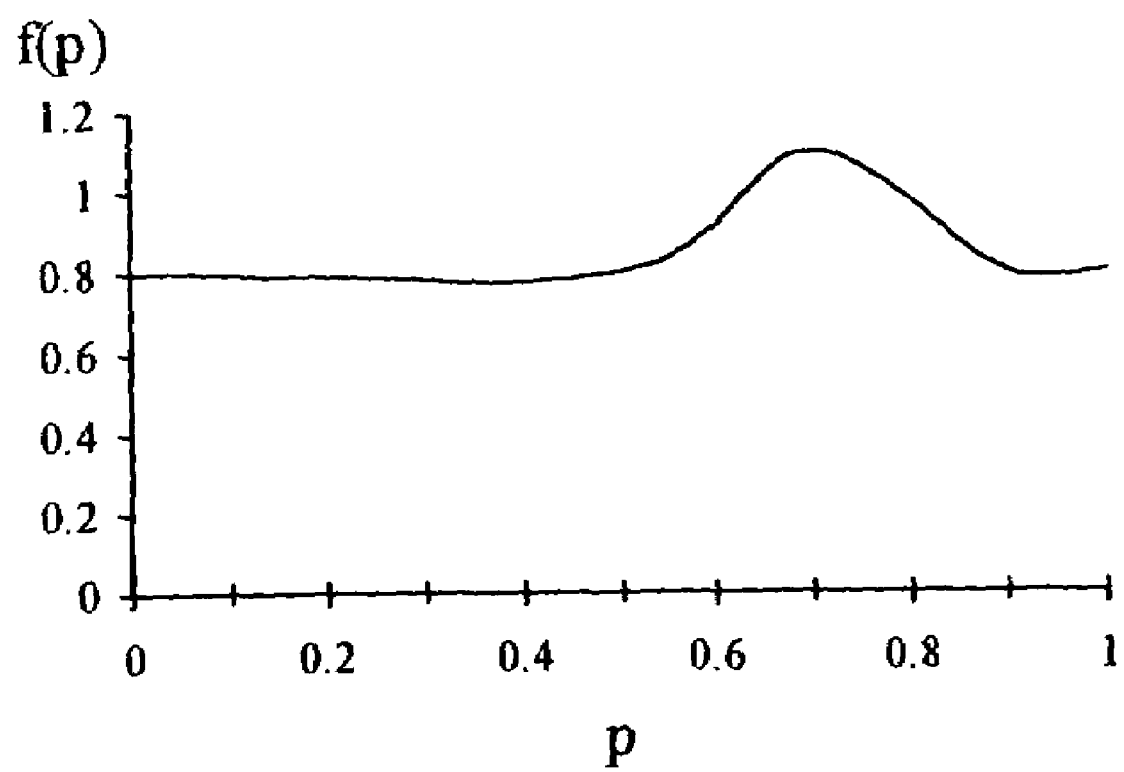
FIG. 6 displays a vague (relatively uninformative) Bayes prior density $f(p)$ for the parameter p=Prob(cure) in a statistical drug trial study.
Figure 7:
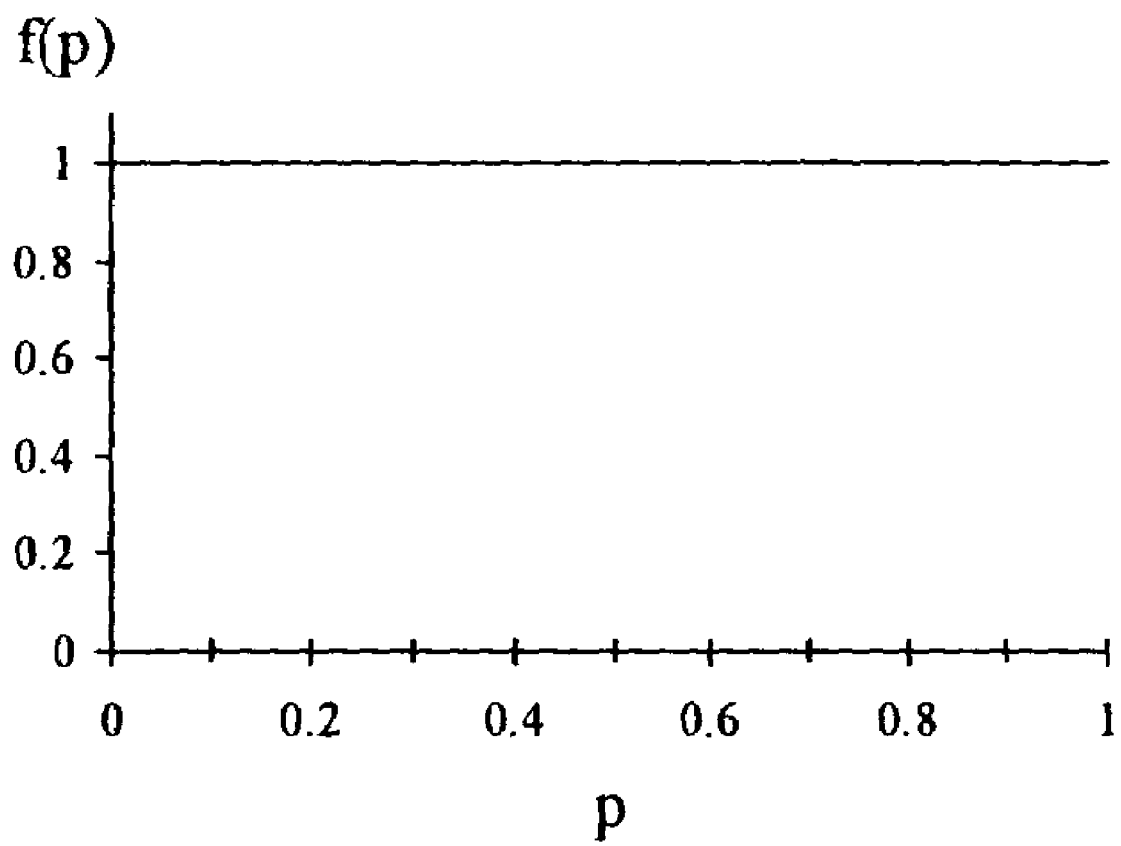
FIG. 7 displays a totally uninformative Bayes prior density $f(p)$ in a statistical drug trial study.
Figure 8:
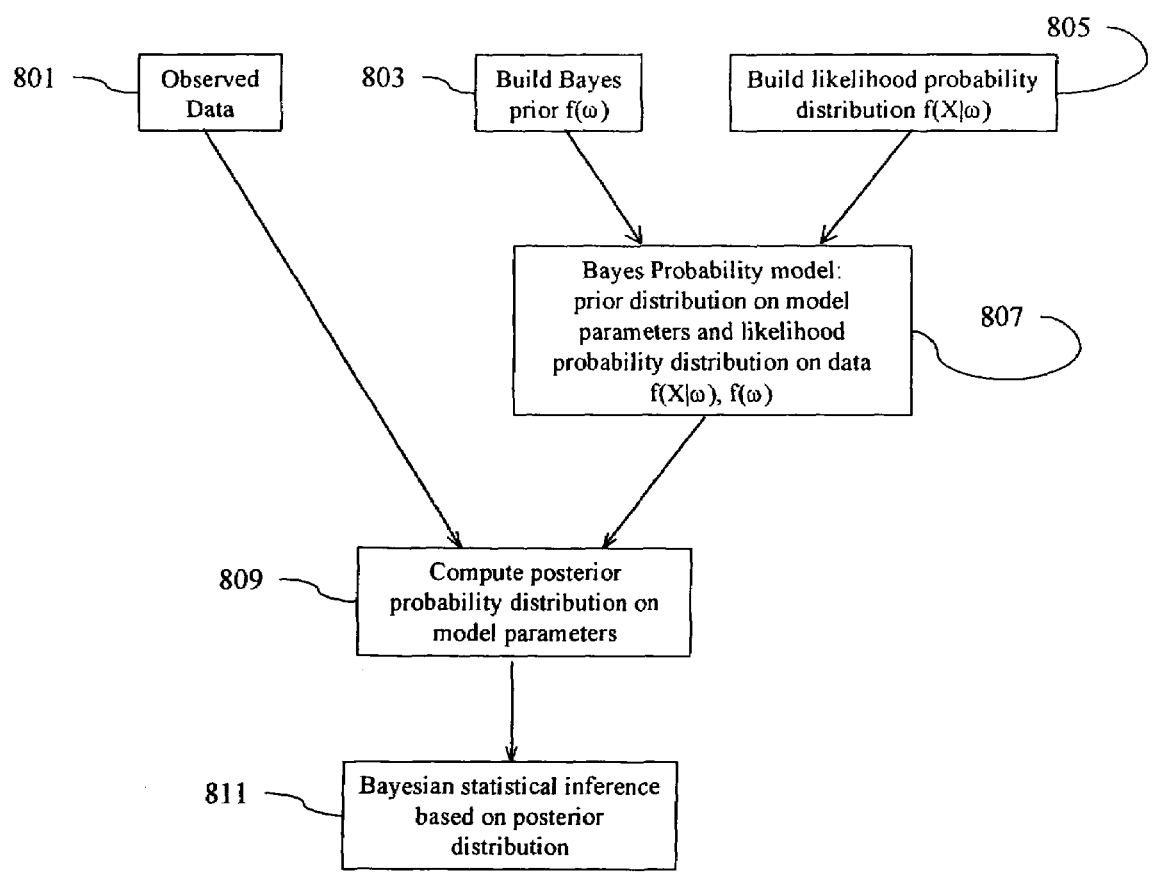
FIG. 8 displays the components of the basic Bayes probability model statistical inference paradigm.
Figure 9:
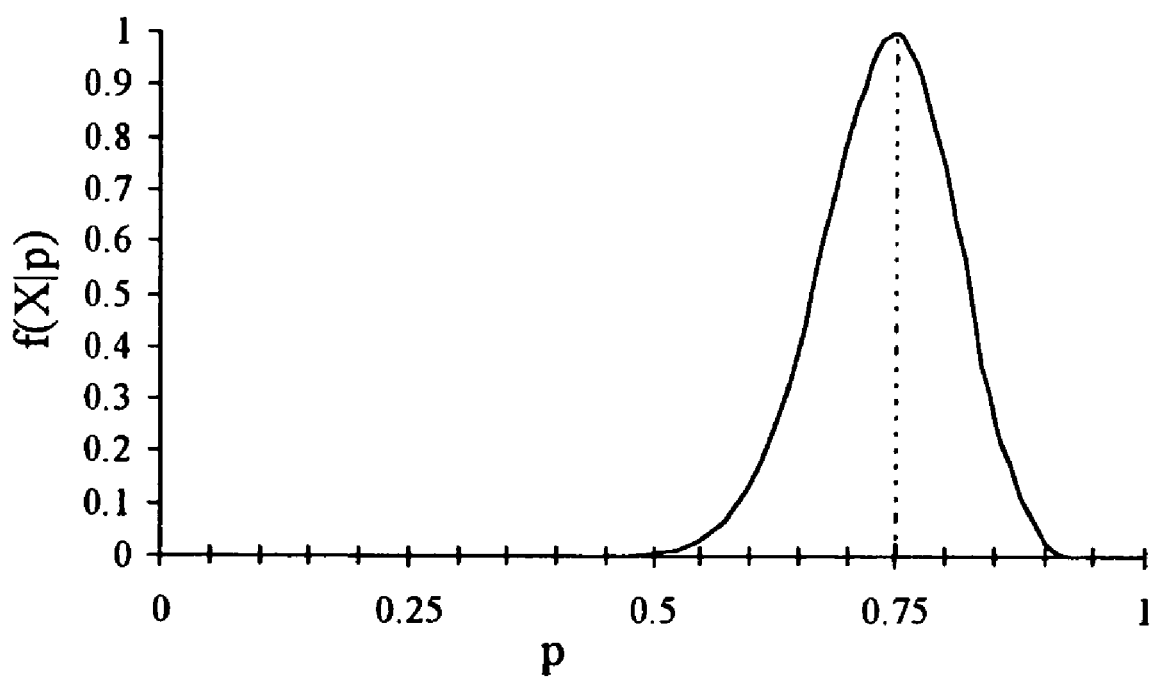
FIG. 9 displays the likelihood function $f(X|p)$ for p=Prob(cure) in a statistical drug trial study where the data was 30 cures out of 40 trials, indicating that p=0.75 maximizes the likelihood function.
Figure 10:
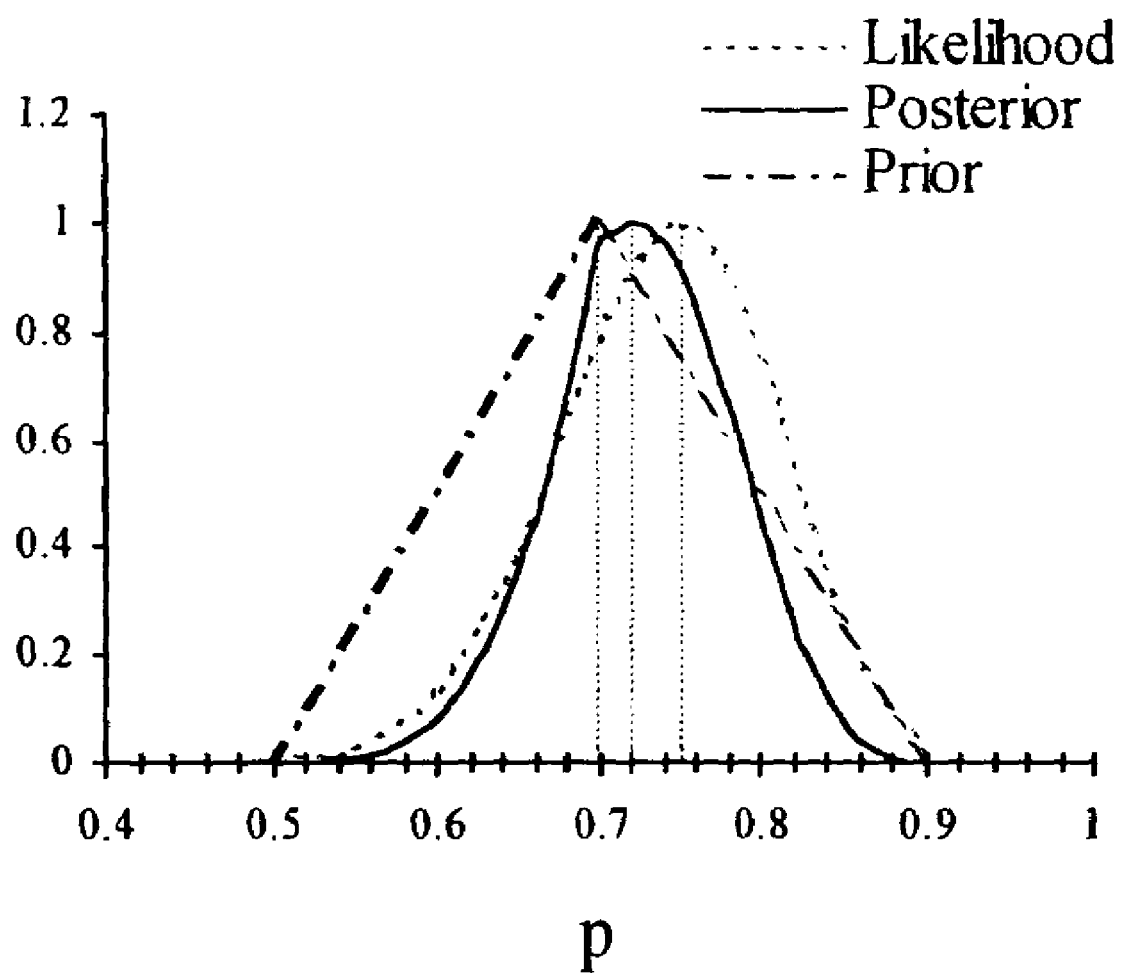
FIG. 10 displays simultaneously the the prior density, the likelihood function, and the posterior distribution for p: $f(X|p)=f(30$ cures out of $40|p)$ where p=Prob(cure) in a statistical drug trial study producing 30 cures out of 40 trials. This illustrates the effect of a Bayesian prior distribution on the standard statistical maximum likelihood estimate of p=0.75, producing the Bayesian posterior estimate of p=0.72.
Figure 11:
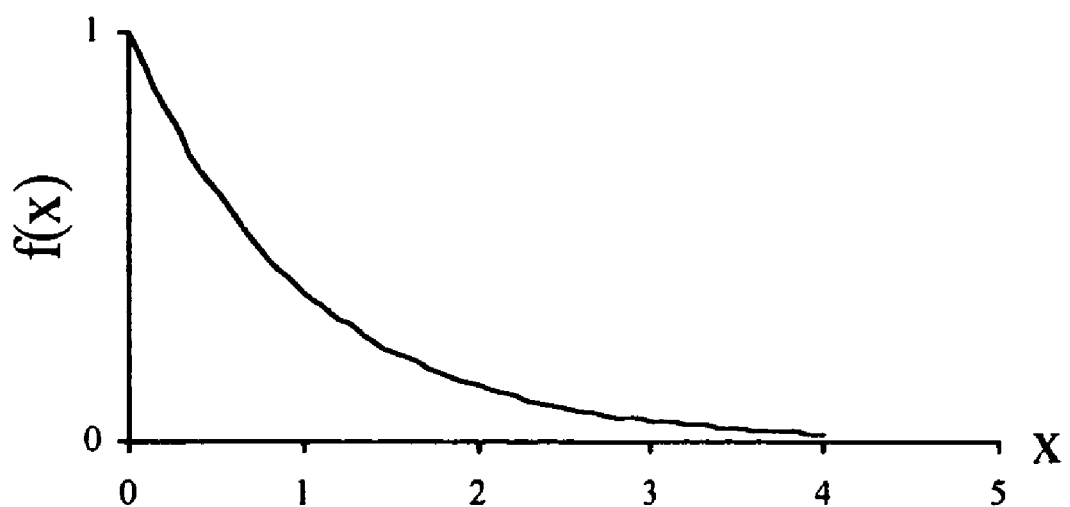
FIG. 11 displays the function $e^{-x}$, which is to be integrated via simulation.
Figure 12:
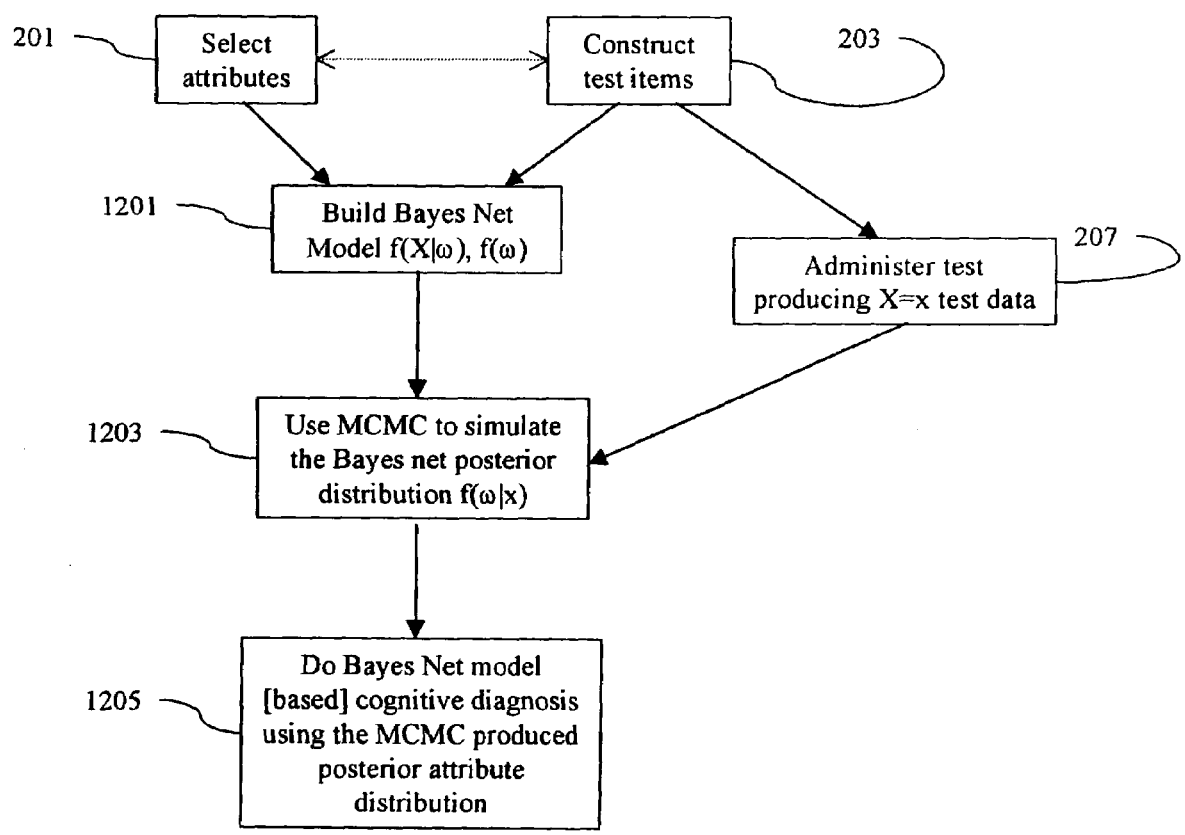
FIG. 12 displays a flow chart of Robert Mislevy's Bayes probability inference network approach to cognitive diagnosis.
Figure 13:
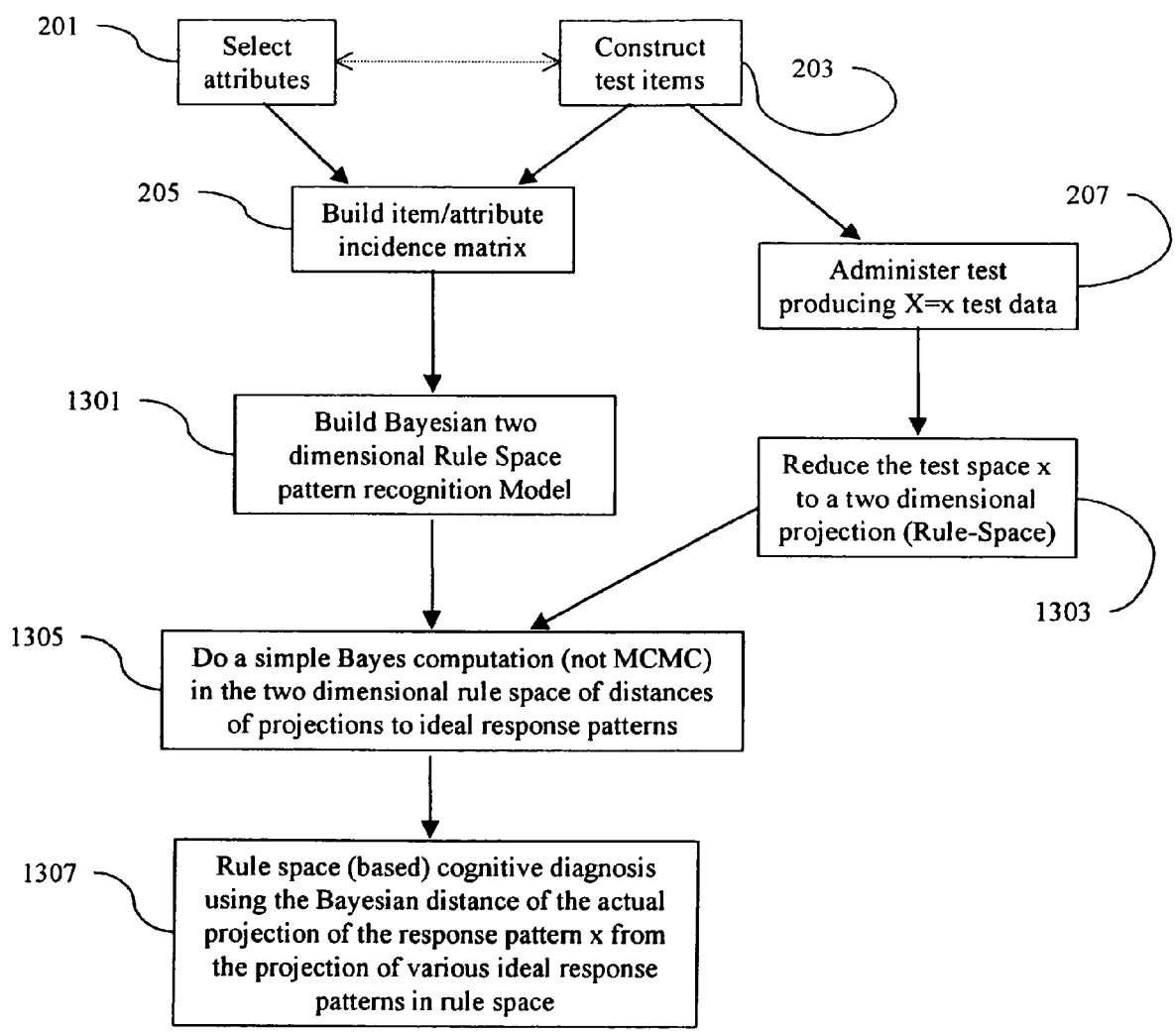
FIG. 13 displays a flow chart of Kikumi Tatsuoka's Bayesian Rule Space approach to cognitive diagnosis.
Figure 14:
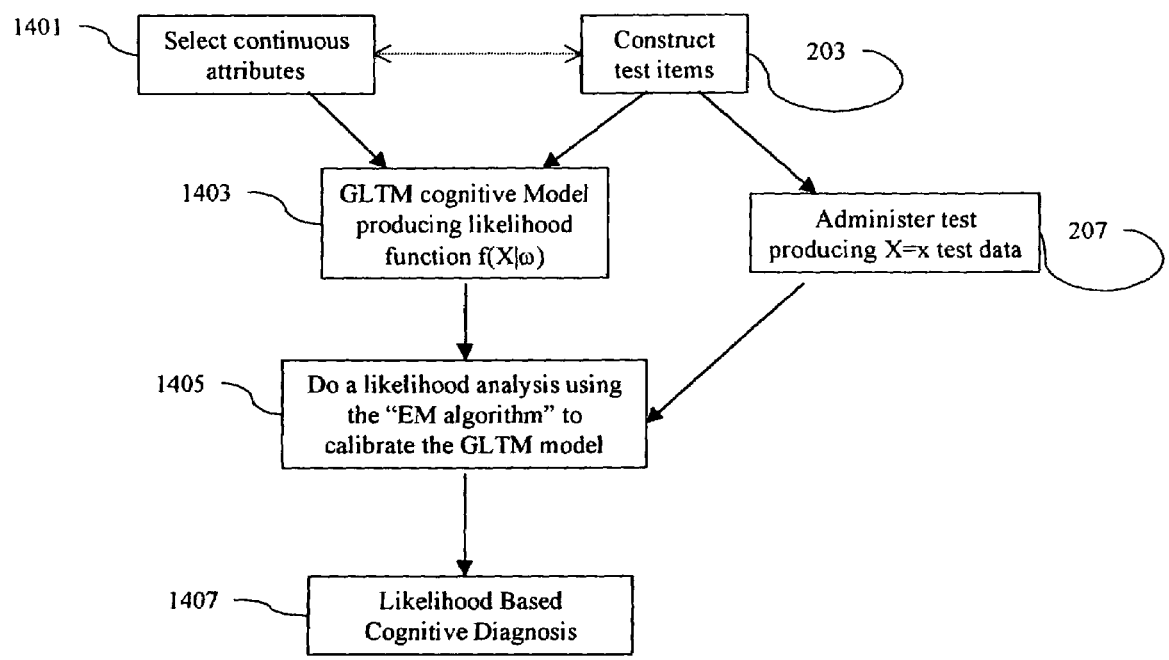
FIG. 14 displays a flow chart of Susan Embretson's GLTM approach to cognitive diagnosis.
Figure 15:
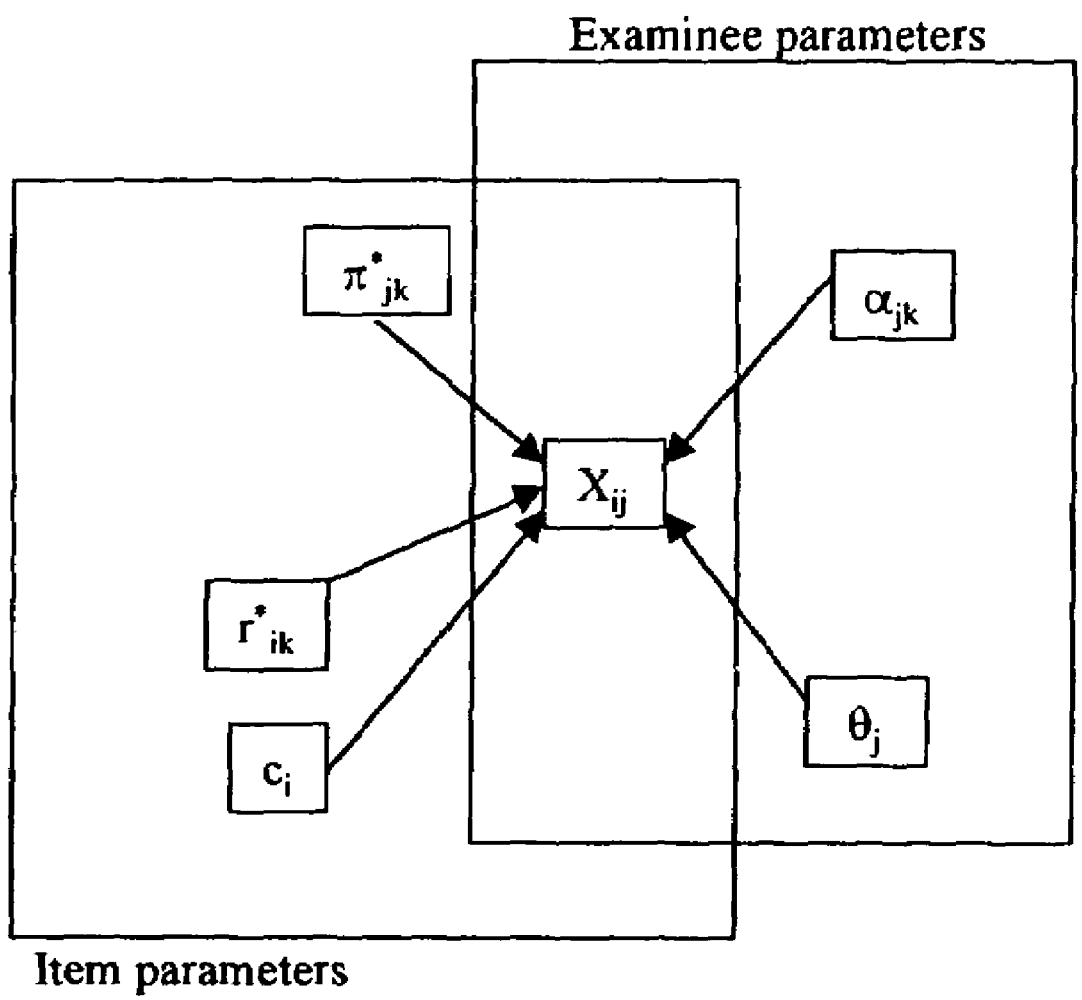
FIG. 15 displays a schematic of the UM likelihood for the random response of one examinee to one item, indicating the examinee parameters and item parameters influencing the examinee response $X_{ij}$ for the reparameterized Unified Model used in the present invention.

Basic concepts of the recast UM used in the invention are explained next. Frequent referral to FIG. 15, comparing FIG. 15 with FIG. 3, and examining Equations 5 and 6 is essential. Understanding what is unique about the UM as modeled by the present invention is key to understanding what is unique and effective about the cognitive diagnostic algorithm of the present invention. Some of this has already been explained in the description of the prior art 1995 version of the UM. What makes the UMCD work effectively to do cognitive diagnoses is unique to FIG. 15 and Equations 5 and 6 described below.

As already stated, one cognitive construct of fundamental importance in the UM is positivity, which is made explicit in Equation 5 for $S_{ij}$ using the reparameterized $\pi^*$ and $r^*$ of Equation 6 as explained below. Equation 5 is analogous to Equation 3 for $S_{ij}$, which used the original parameterization in terms of r and $\pi$. Both equations for $S_{ij}$ give the probability that the included attributes are applied correctly to the solution of Item i by Examinee j. Equation 5 provides a reparametization of the $\pi$'s and r's in order to achieve substantively meaningful parameters that are identifiable. The Equation 3 version of $S_{ij}$ is replaced with the Equation 5 version below, noting that both formulas produce the same value for $S_{ij}$.

$$S_{ij} = (\pi_i^*) \times (r_{i1}^*)^{1-a_{j1}} \times (r_{i2}^*)^{1-a_{j2}} \times \ldots \times (r_{im}^*)^{1-a_{jm}} \quad (5)$$

As stated above, the general approach to reparameterization requires defining the new identifiable parameters ($\pi^*$'s, $r^*$'s) as functions of the old, non-identifiable parameters ($\pi$'s, r's). This is simply done as follows. Consider on item i requiring k=1, . . . , m attributes. Then defining $\pi^*_i = \Pi \pi_{ik}$ (product is over k) and $$r^*_{ik} = r_{ik}/\pi_{ik} \quad (6)$$

produces the reparameterization. Note that there are 2 m $\pi_k$ and $r_{ik}$ and only m+1 $\pi^*_i$ and $r^*_{ik}$.

As stated, the $i^{th}$ item requires m attributes labeled 1,2, . . . m and $a_{jk}$=1 or 0 denotes whether examinee j has mastered attribute k or not. Then $\pi_i^*$ is interpreted as the probability that an examinee who has mastered all of the required attributes for item i indeed applies them correctly. That is, $\pi_i^*$ is a measure of how difficult the item is for an examinee who has mastered all the required attributes.

Next, $r_{i1}^*$ for Attribute 1 is by its definition above the probability of applying the attribute correctly to Item i if not mastered divided by the probability of applying the attribute correctly if mastered. The $r^*$'s for the other attributes are defined similarly. A value of $r_{ik}^* \approx 0$ for an Attribute k simply means that there is a big advantage to having mastered the attribute when trying to answer Item i correctly. An $r^*_{ik}$ relatively close to 1 simply means there is little advantage to having mastered the Attribute k over not having mastered Attribute k when trying to solve item i.

If the $\pi_i^*$ is close to 1 and all the $r_{ik}^*$'s are close to 0 for Item i, then the required attributes are referred to as highly positive for Item i. "Highly positive" as before simply means that with high probability an examinee uses the attributes required for the item correctly if and only if the examinee possesses all of the attributes that the model says are needed for the item.

It should be noted that the $r^*$'s and the $\pi^*$'s together with the mastery-setting $p_k$'s of FIG. 16 (with mastery setting explained below as well) is sufficient to produce the needed identifiability that was missing in DiBello et al. This number of parameters is sufficient to achieve identifiability once attribute mastery levels are specified.

The Hierarchical Bayes UM, Including the Setting of Mastery Levels and the Introduction of an Attribute Positive Correlational Structure The role of the Bayesian portion of the Bayes UM is important as the reparameterized UM formula for achieving effective and powerful cognitive diagnoses is. This is done by introducing a Bayes model with hyperparameters, a hierarchical Bayes model. As stated in the Description of the Prior Art section, a Bayesian model is a probability model for which the model parameters are also assigned a probability distribution. A Bayesian model with hyperparameters is a Bayesian model in which the prior distributions of the basic parameters of the model are in turn also given parameters each having a prior distribution. These additional parameters that control the prior distribution of the usual model parameters are referred to as hyperparameters. A good reference for Bayes modeling in general and hierarchical Bayes modeling in particular is Gelman et al.

Figure 16:
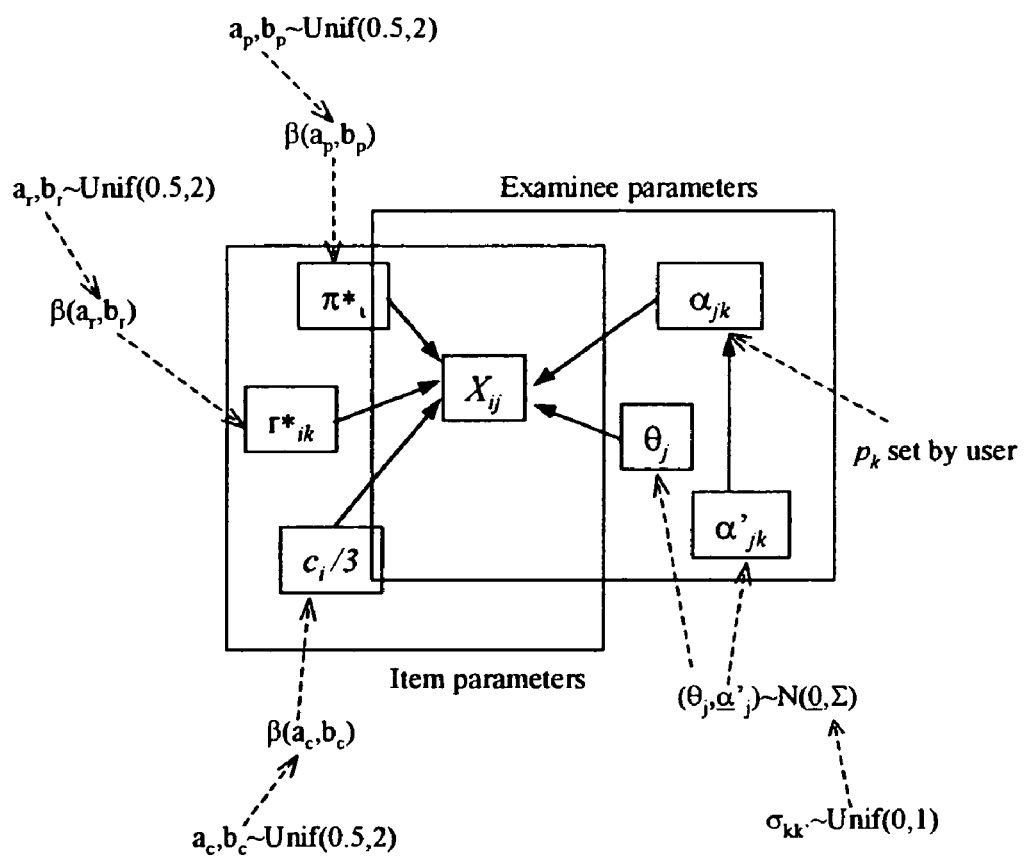
FIG. 16 displays the dependence representation of the identifiable Bayesian version of the reparameterized UM used in the invention including prior distributions and hyperparameters.

FIG. 16 schematically displays the hierarchical Bayes model for an examinee responding to an item as modeled by our hierarchical Bayes UM. As such it is an augmentation of the reparameterized likelihood schematic of FIG. 15.

In the FIG. 16 diagram, the model parameters $\pi^*$, $r^*$, and c/3 have a prior beta distribution, denoted $\beta(a,b)$ for each item i, each such distribution determined by two parameters (a,b). Beta distributions tend to work well as prior distributions for parameters that are constrained to lie in the interval (0,1), as indicated and explained in Chapter 2 of the Gelman et al book, and which is true of $\pi^*$, $r^*$, and c/3. In particular the beta distribution parameters (a,b) provide a rich family of densities from which just about any choice of shape for the prior may be selected, an attractive property from the modeling perspective. Each (a,b) hyperparameter has been given a uniform distribution on the interval (0.5,2). This means that each value of the parameter, $a_r$ say, within the interval (0.5,2) is equally likely. This uniform prior over a wide interval is the kind of suitable relatively non-informative (vague) prior that is effective in hierarchical Bayes models in that it allows the model to fit the data well without the prior having an inappropriately strong influence on the statistical inference. It is noted that these distributional choices (beta, uniform) are fairly standard choices, although a certain amount of judgement is required to construct prior distributions for the relevant variables.

The Bayesian structure associated with the examinee latent ability parameters (that is, the incompleteness residual ability θ and the attribute mastery/nonmastery components of $\underline{\alpha}$) is now explained. This explanation serves to highlight two important components of the current UM procedure, namely specifying attribute mastery levels and assuming a positive correlational attribute structure as part of the Bayes model. It is assumed the examinee attributes and θ are derived from a multivariate normal distribution with positive correlations. A multivariate normal distribution is a standard and well-understood distribution for statisticians. For example if a person's weight and height is measured, then the standard model is a bivariate normal distribution with weight and height positively correlated. For more information, consult any standard statistics textbook.

Specifying the prior distribution of attributes $\underline{\alpha}$ and θ is done in two stages. At stage one, (θ,$\underline{\alpha}'$) is given a multivariate normal prior, where $\underline{\alpha}'$ is the continuous precursor of the dichotomous valued (0/1 valued) components of $\underline{\alpha}$ that specify mastery or nonmastery for each attribute for each examinee. The attribute pair correlations $\sigma_{kk'}$ (hyperparameters) for $\underline{\alpha}'$ are assigned a uniform prior distribution on the interval (0,1) because all that is known about them is that they are positive. Then the attribute mastery/nonmastery vector $\underline{\alpha}$ comes from dichotomizing each component of $\underline{\alpha}'$ into a 0 or 1 according as its value is larger than or smaller than the user specified mastery level, which is determined most simply by the user-specified examinee mastery proportions (probabilities) $p_k$ for each attribute. That is, the user specifies what it means to be a master of an attribute by specifying the proportion of masters of each attribute (other methods of specifying attribute mastery can be found and in fact may be preferable but this is the most straightforward). For example if the user specifies $p_k=0.7$ then the attribute k is said to be mastered by 70% of the examinees. Then $\alpha_k=1$ 70% of the time, in fact when its corresponding $\alpha'_k$ is sufficiently large. Then $\alpha_k=0$ the other 30% of the time.

To help explain the need to specify mastery levels, consider the following thought experiment. What does it mean to say that somebody displays mastery for the factorization of polynomials (Attribute 1)? Clearly a disagreement on the appropriate level of competency required could occur. So, specifying that 60% ($p_1=0.6$) of the population of examinees are masters has the effect of defining precisely the mastery level. Choosing 80% instead has the effect of demanding a higher level of cognitive functioning before labeling a person as having mastered the attribute.

In addition to the importance of specifying mastery levels, it must be reemphasized that the positive correlational structure for the component attribute pairs of $\underline{\alpha}$ assumed in the Bayes portion of the UM improves cognitive diagnostic accuracy. For, this positive correlational structure allows the model to capture the all-important fact that examinees that have mastered one attribute are more likely to have mastered another attribute; that is, attributes are positively correlated or more simply, positively associated. Moreover, this very important building-in of a positive correlational structure for the attributes was done by casting the UM in a Bayes framework. However, the present invention is not limited to the Bayesian framework. Thus combining an effective positive correlational attribute structure (currently done using a Bayes approach) with the reparameterized and hence identifiable and level-of-mastery-specified UM are all components useful for producing an effective UMCD. That is, each of these, in combination with others, and in combination with the UM, which is defined as any attribute based diagnostic model using positivity and completeness to develop its equations, contribute to present invention performance.

FIG. 16 schematically shows an embodiment of the hierarchical Bayes UM in the UMCD Thus, the present invention is not limited to the embodiment of the UMCD with its Bayes model and cognitive diagnostic MCMC computational algorithm.

It is important to realize that the conversion of a non-Bayesian probability model to a Bayes probability model is an activity that is entirely distinct in its details from application to application. Such activities are seldom the same. Thus, the effort begins afresh for each distinct, new setting where Bayes modeling of the data is required. In particular, there is not one right way to develop an appropriate Bayes model. Moreover, an appropriately chosen Bayes model, as done so for the UM, can make effective use of all the information in the data and hence achieve much more accurate inferences (in this case, much more accurate cognitive diagnoses).

Figure 2:
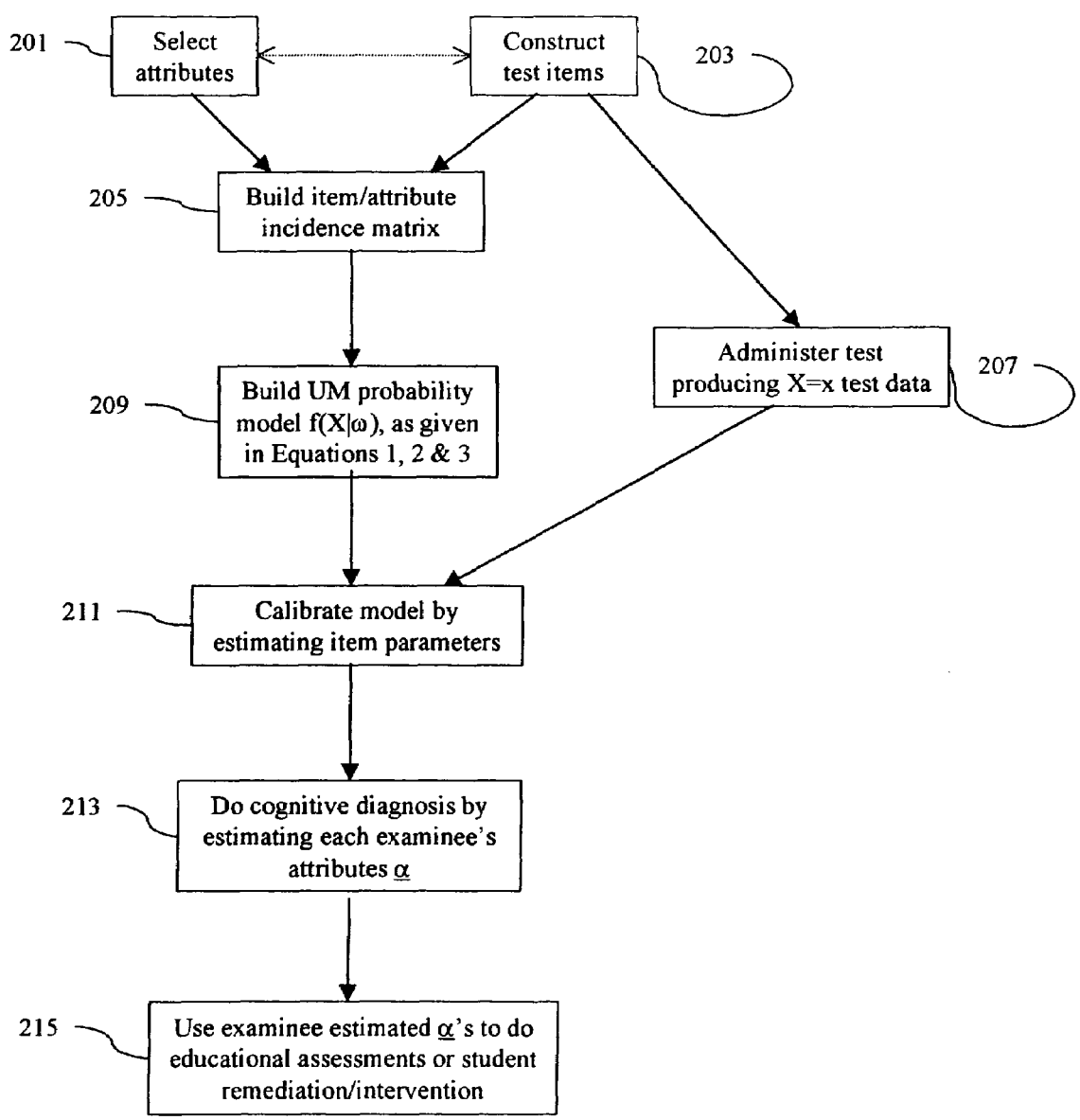
FIG. 2 displays the flow chart for the 1995 prior art proposed UM cognitive diagnostic procedure.
Figure 17A:
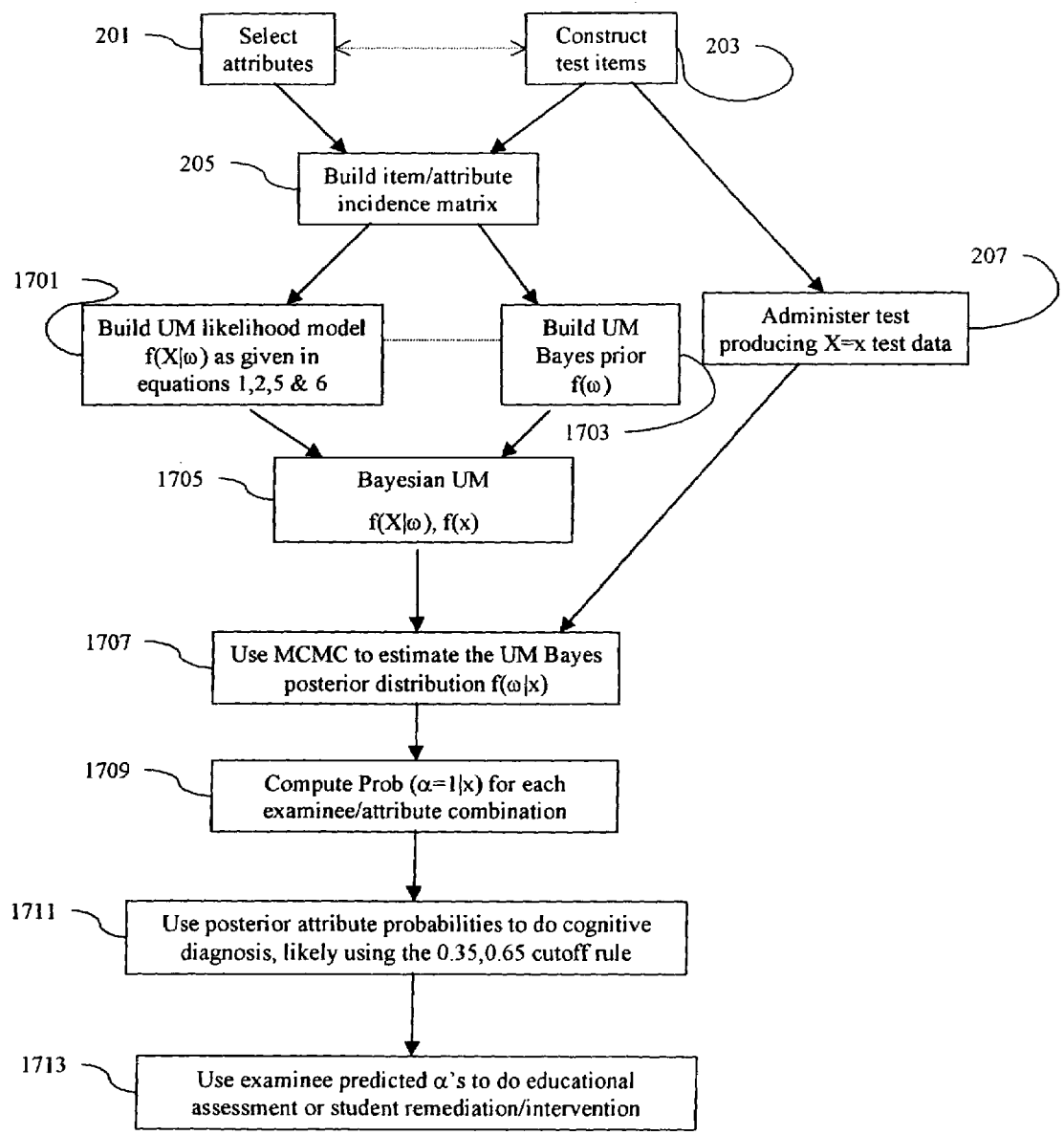
FIG. 17a displays the flow chart of the UM cognitive diagnosis procedure used in the present invention.

FIG. 17a provides a flow chart of the method of the present invention. First note that the Blocks 201, 203, 205, and 207 are identical to the UM based blocks of FIG. 2. This reflects that both take the same approach except for the details of the UM model used. Thus the non-Bayesian approach of FIG. 2 and the Bayes approach of FIG. 17a diverge from Block 205 down. First, although both require a likelihood model, as already discussed, reparameterization issues related to the nonidentifiability of the 1995 UM led to the discovery of the reparameterization given in Equation 5 to replace the old parameterization of Equation 3. Further, building the likelihood model (Blocks 209 and 1701 respectively) now also requires a "Build UM Bayes prior f(ω)" block (Block 1703), thus producing the Bayes model Block 1705. Blocks 1701, 1703 and 1705 of FIG. 17 reflect Equations 5 and 6 as well as the FIG. 16 schematic. Blocks 1707, 1709, and 1711 are understood as follows. The needed posterior distributions f(ω|X) is obtained as explained above via MCMC (Block 1707). Then the posterior probabilities of unidimensional $\alpha_{ik}$'s (to make individual attribute/examinee cognitive diagnoses) are extracted from the posterior probability f(ω|x) by standard techniques, yielding Block 1709, which yields Prob (α=1|X) for each examinee/attribute combination. Then using a strength of evidence rule such as illustrated in the example below, cognitive diagnoses for every examinee/attribute combination (Block 1711) is obtained.

A Brief Description of the MCMC Algorithm Used in the Bayes UM of the Invention. The general description of the MCMC algorithmic approach used for the Bayesian UM can be read about in Patz et al in sufficient detail for people with ordinary skill in the art to create and use it. As already stated, the approach is referred to as the Metropolis-Hastings algorithm embedded within a Gibbs sampler, or M-H within Gibbs for short. The Metropolis Hastings algorithm allows for simplification of the calculation of the posterior distribution by eliminating the calculation of the denominator (see Equation 4) usually present in posterior distribution calculations. The Gibbs sampler allows the remainder of the calculation (the numerator of Equation 4) to be partitioned into bundles that are individually easier to calculate than they are jointly (because jointly the calculations interactively depend on one another). M-H within Gibbs is one of numerous variations of the basic MCMC approach.

In the case of MCMC, the simulated random numbers of the Markov Chain are probabilistically dependent (like the daily high temperatures on two consecutive days). And, as is carefully explained in Patz et al (and in any other good general reference on doing Bayesian analysis using MCMC, such as in Gelman et al or in Gilks et al), the MCMC simulation avoids entirely the computing (or even simulating of it) of the integral in the denominator and instead produces a "chain" of random numbers whose steady state probability distribution is the desired posterior distribution. In simple and practical terms, this means that if the chain for can be run a long time, then the observed distribution of its simulated random numbers tells approximately what the required posterior distribution is, thus bypassing the direct or simulated computation of it.

As a practical matter, in the Bayes UM setting, MCMC estimates the required posterior distribution with surprising accuracy because we a large number of random numbers of the chain are generated. In particular the procedure of the present invention typically runs a chain of length 15000 with the first 5000 generated simulations of the chain thrown out because they are not yet in the required steady state. The MCMC simulation approach is at present the only viable approach for statistically analyzing parametrically complex Bayes models.

Recall that the essence of a statistical analysis is the caution to not go beyond the sometimes limited evidence to support inferential conclusions drawn. In the case of the present invention, this relates to Block 1711 of FIG. 17*a* where inferences about mastery versus nonmastery are sometimes withheld for certain examinee/attribute combinations due to lack of strong statistical evidence:

Requiring Strong Statistical Evidence to Make an Inference of Mastery or Nonmastery (Block 1711 of FIG. 17*a*) Referring back to the cognitive example of the statistics test, Susan might be inferred to have a posterior probability of mastery of histograms of 0.1 (Attribute 1), mastery probability of 0.53 for medians/quantiles (Attribute 2), mastery probability of 0.81 for averages/means (Attribute 3), etc. The current Bayes UM cognitive diagnostic mastery assignment rule assigns mastery for posterior probabilities above 0.65 and non-mastery for posterior probabilities below 0.35 and withholds mastery assignment otherwise (see Block 1711; this a convention that is certainly subject to change). Cutoff values of 0.8 and 0.2 are sometimes used when very strong evidence is demanded before assigning mastery or non-mastery.

Suppose the 0.35 and 0.65 cutoff values are applied. Then, because Susan's posterior probability of 0.81 is greater than 0.65, Susan is judged to have mastered histograms, because 0.1 is less than 0.35 Susan is judged to have not mastered averages/means, and because 0.53 is above the cutoff for non-mastery and below the cutoff for mastery, judgment is withheld for medians/quantiles mastery. This capability to withhold assignment when the amount of information in the data is not sufficient to provide strong evidence of attribute mastery or non-mastery is a real strength of the UM statistical method.

A Computer Simulation Study of UMCD Applied to Test Data Using Tile Cognitive Structure From the Introductory Statistics Exam of Example 2

The purpose here is twofold. First, it is desired to further lay out the major steps of the use of the current UMCD so as to make explicit how the procedure is carried out. Second evidence of the effectiveness of the present invention in achieving a cognitive diagnosis is given.

A computer simulation study is constructed demonstrating the power of the use of the current UMCD to cognitively diagnose student attribute mastery based upon the introductory statistics exam, as referred to earlier in Example 2 (refer also to FIG. 19 for the specific item/attribute structure). This simulation is described by following the flow chart of FIG. 17*a*.

A computer was programmed to generate data using the cognitive structure from the exam. FIG. 18 gives a sample set of questions (items) 9-18 of this 40 question exam (Block 203 of FIG. 17*a*).

The eight attributes described earlier were chosen (Block 201). The attribute/item structure is given in the table of the item/attribute incidence matrix given in FIG. 19 (Block 205). The user developed this matrix, in this case the patent applicants.

The eight statistics knowledge attributes from Example 2 should be recalled: (1) histogram, (2) median/quartile, (3) average/mean, (4) standard deviation, (5) regression prediction, (6) correlation, (7) regression line, and (8) regression fit. For example, Item 17 above requires attributes (1), (3), and (4). It is noted, as in the case in this simulation example, that in a typical application of the UMCD the user will construct the test questions and decide on the major attributes to be diagnosed (perhaps selecting the attributes first and then developing questions designed to diagnose these attributes) and hence made part of a. Referring to this item/attribute table of FIG. 19, in order to simulate data positivity and completeness, parameters were generated for the 40 items that allow for slight to moderate incompleteness and slight to moderate non-positivity, but in general reflect a test that has a highly cognitive structure, and simulated examinee response data was created (that is, for each of the 500 simulated examinees, a string of 40 0s and 1s was simulated, indicating which items are gotten right and which wrong). "Slight to moderate incompleteness" means the probability of whether or not an examinee gets an item correct is mostly based on which of the eight specified attributes the examinee possesses and lacks that are relevant to that item. The slight to moderate incompleteness in the simulated data was achieved by spreading the c values between 1.5 and 2.5 fairly uniformly. The (perhaps many) other attributes influencing performance on the items are assumed to have only a minor influence.

"Slight to moderate non-positivity" means examinees lacking any of an item's required attributes (from among the listed eight attributes) will likely get the item wrong. The "slight to moderate non-positivity" was achieved by having the $r^*$'s fairly uniform between 0 and 0. 4 and having the $\pi^*$'s fairly uniform between 0.7 and 1. Noting that incompleteness is also slight to moderate as just discussed, it can be seen that an examinee possessing all the item's required attributes will likely get the item right. Also, an examinee lacking at least one required attribute will likely get the item wrong.

The abilities $\theta$ and attributes a for 500 simulated examinees were generated with each attribute having a mastery rate of 50% and with the residual $\theta$ abilities distributed according to a standard normal distribution. Further, the correlations between attribute pairs and between $(\alpha, \theta)$ pairs were assumed to be around 0.3, as was judged to be realistic. For example, Examinee 1 might be simulated to have $\underline{\alpha}a$=(0 1 1 1 0 1 1 1), amounting to mastery on six of the eight major attributes.

Then, for each examinee and each item, the simulation in effect flips a coin weighted by his/her predicted probability of correctly responding to the item according to the UM of Equations 1, 2, 5, and 6. A sample size of 500 taking the test (Block 207) was simulated because that is the approximate size of (or even smaller than) a typical large introductory statistics course at a large university in a semester. It is also a reasonable size for all the students taking a core course (like Algebra II) within a fairly large school district.

The goal of this study is to observe how effective the UMCD is in recovering the known cognitive abilities of the examinees (the cognitive abilities are known, recall, because they were generated using a known simulation model fed to the computer). In order to determine how effective a statistical method such as the UMCD is, assessing the method's effectiveness in a realistic computer simulation is one of the fundamental ways statisticians proceed. Indeed, the fact that the simulation model, and hence its parameters generating the data, is known is very useful in using simulation studies to evaluate the effectiveness of a statistical procedure.

Blocks 205, 1701, 1703, and 1705 of FIG. 17a constitute the assumed Bayes model, as given by Formulas 1, 2, 5, and 6. The simulated examinee response data (a matrix of 0s and 1s of dimension 500 by 40 (Block 207) was analyzed using MCMC (Block 1707) according to the identifiable Bayes UM schematically given in FIG. 16. For each examinee attribute combination a chain of length 15,000 was generated, with the first 5000 values discarded to avoid any potential influence of the starting values of the chain (Block 1707). According to the MCMC theory, this chain of 10000 values estimates the desired posterior distribution of attribute mastery for each examinee. For example if Examinee 23 for Attribute 4 has 8500 1s and 1500 0s, then the simulation data based posterior probability of Examinee 23 mastering Attribute 4 becomes 8500/10000=0.85 (Block 1709). According to the procedure an examinee was declared a master of an attribute if the posterior probability was greater than 0.65 and a non-master if the posterior probability was less than 0.35 (Block 1711). These mastery/non-mastery settings may be modified in the practice of the present invention.

The procedure performed extremely effectively, correctly diagnosing attribute mastery versus non-mastery in 96.1 % of the examinee/attribute combinations (8 attributes times 500 examinees is 4000 examinee/attribute combinations minus the 176 attribute/examinee combinations where a diagnosis was withheld because of weak evidence, when the posterior probability was between 0.35 and 0.65). Considering that a modest length test with 40 multiple-choice items with respect to 8 attributes is used, it is impressive that the cognitive diagnosis was so accurate. In fact, if stronger evidence was demanded by using 0.8 and 0.2 as cutoff values, the correct diagnosis rate increases to 97.6%, but diagnosis is withheld for 456 attribute/examinees combinations. This is strong scientific evidence that the procedure is effective as a cognitive diagnostic tool.

The item parameters were also well estimated (calibrated). The average difference between the estimated and true $\pi^*$ and the estimated and true $r^*$ values is 0.03 (the range for both parameter types is from 0 to 1), and the average difference between the estimated and true c is 0.3 (the range is between 0 and 3). As expected, the values of c were not as well estimated as the $\pi^*$ values and $r^*$ values were estimated because the exam was designed to have a highly cognitive structure (that is, relatively positive and complete) and was designed to test a group of examinees modeled to understand the attributes well (i.e. many of them are masters and hence can be expected to have relatively high $\theta$ values). Although the model is parametrically complex, it is possible to estimate the key parameters well and hence calibrate the model well. Because of this, there is no risk of being hurt by the variance/bias trade-off, as represented above in the example of data that truly follow a four parameter cubic polynomial model. In that case either the situation could be misrepresented by computing a reliable estimate of the one parameter in the biased linear model, or the situation could be misrepresented by computing unreliable estimates of the four parameters in the unbiased cubic polynomial model. By contrast, here in the UMCD simulation, the parameters of the complex and well-fitting UM are estimated well.

The constructs of positivity and completeness as expressed through identifiable and easily interpretable parameters are intuitively easy for the educational practitioner to grasp. Moreover, these constructs provide the practitioner with a realistic yet tractable way of modeling the inherent randomness of attribute based examinee responding. Further, the introduction of the latent variable $\theta$ to handle incompleteness provides the educational practitioner enormous freedom in selecting which and, in particular, how many attributes to explicitly include in the UM-based cognitive model. Finally, allowing the user explicit control over attribute mastery levels is important, as is the positive attribute correlational structure assumed in the Bayes portion of the UM. In fact, the realization that one should choose a Bayesian model that in particular presumes positively associated attributes through an appropriately chosen prior on the attributes solved a major practical problem that existed for implementing the 1995 UM, namely its failure to take advantage of the fact that attributes are always positively correlated, a fact very useful (when used!) in achieving high accuracy when doing cognitive diagnoses. Indeed, simulation studies showed that Bayes UMs with the positive correlational structure between attributes incorporated performed dramatically better than Bayes UMs without such positive correlational structure. Just to be clear, one major contribution incorporated in the current version of the UM diagnostic approach is the realization that a probability modeling structure should be built that achieves positively correlated attributes, and that taking a Bayes probability modeling approach is an excellent way to do it.

In a real data test/retest PSAT setting studied under a grant from the Educational Testing Service, the UMCD approach managed to consistently classify over ⅔ of the examinees according to attribute mastery/nonmastery across the two tests (both tests assign attribute mastery or both tests assign failure to master an attribute). This is particularly impressive because the PSAT is a test that by its very design is weak in its providing of cognitive information about specific attributes.

There are several reasons that UMCD is distinguished from and surpasses these other approaches in cognitive diagnostic performance. As already explained, the other approaches use different models than the Bayes UM approach does. Further, the UMCD is the only model that is simultaneously statistically tractable, contains identifiable model parameters that are capable of both providing a good model fit of the data and being easily interpreted by the user as having meaningful cognitive interpretations, specifies attribute mastery levels, incorporates into its cognitive diagnosis the positive association of attributes in the data, and is flexible both in terms of allowing various cognitive science perspectives and in incorporating predicted examinee error to produce suitable cognitive inference caution. The other models can be unrealistic (because of their adherence to a particular cognitive modeling approach) in settings where the approach provides a poor description of the actual cognitive reality. They are often difficult to interpret because they have parameters that are not easily interpreted by users and hence are not be easily understood, especially by the typical educational practitioner. Moreover, many such models do not seem to fit the data particularly well, an absolute necessity for a statistical procedure to work effectively. And, none of them address the fundamental concept of specifying attribute mastery.

Applying the UM Approach of the Present Invention to Medical/Psychiatric Diagnosis Medical diagnostic models are useful for aiding the practitioner in coming up with diagnoses consisting of a list of possible disorders that a medical practitioner compiles based on the symptoms presented by a patient, but they are not a replacement for the practitioner. Thus, a good system will give a reasonably complete list of the probable disorders, although with enough patient information the number of disorders should be manageable.

Figure 17B:
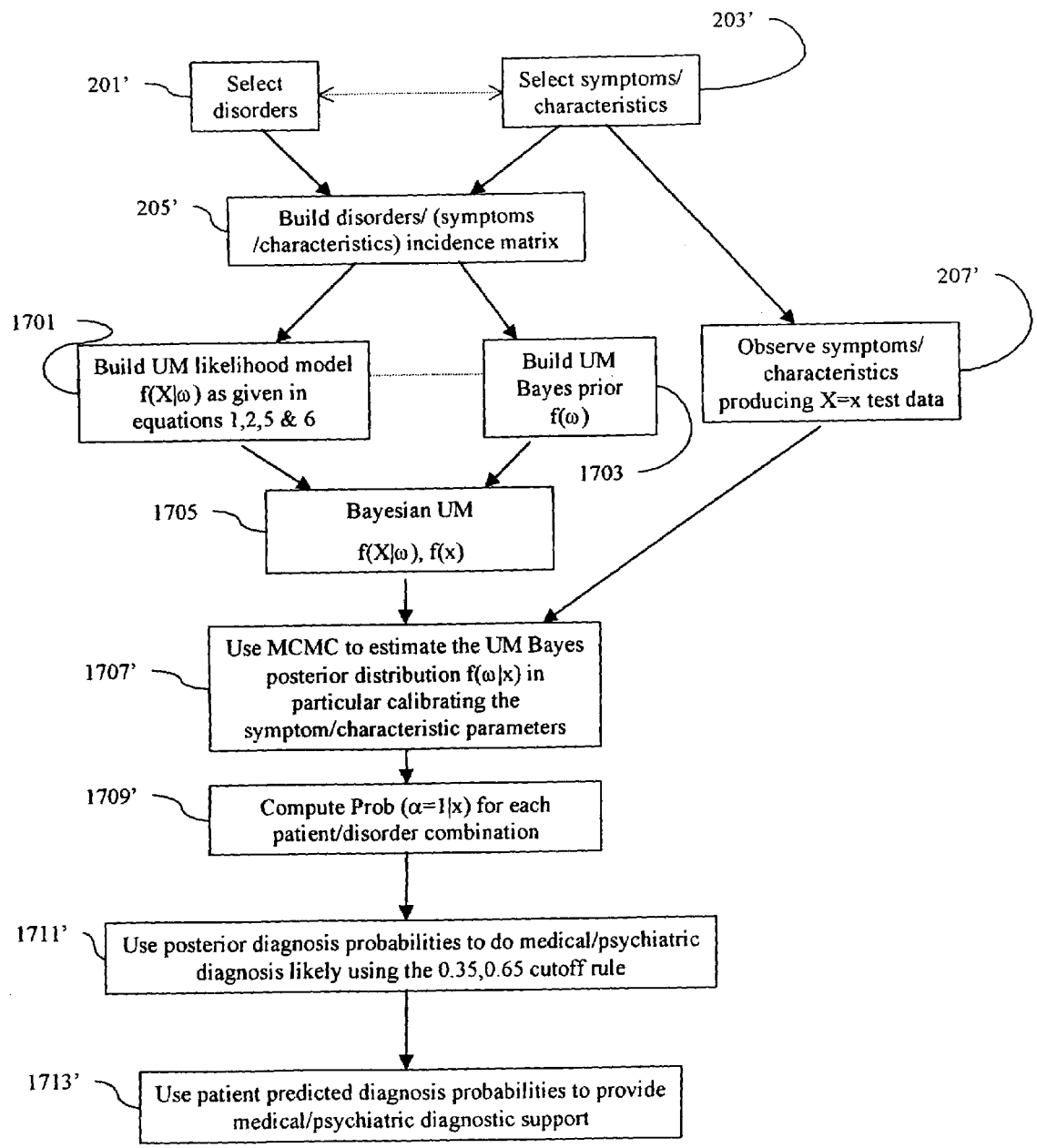
FIG. 17b displays the flow chart of the UM medical/psychiatric diagnosis procedure used in the present invention.

FIG. 17b is a flow chart of the UM medical/psychiatric diagnostic procedure used in the present invention. It should be compared with the FIG. 17a flow chart that gives the analogous UM procedure for cognitive diagnosis. The set of potential disorders replaces the set of attributes (Block 201'), and the set of symptoms and other patient characteristics consisting of such things as dichotomized laboratory test values, age, race, sex, etc., replaces the items (Block 203'). $\theta$ is then a latent health or latent quality of life variable that combines all latent health variables and quality of life variables that are not potential disorders explicitly listed in the model. Then the UM is applied in exactly the same way that it is applied in the educational diagnostic setting (FIG. 17a). Specifically, symptoms/characteristics and disorders are defined (Blocks 201' and 203'), and then an incidence matrix is constructed to indicate which disorders may be related to the presence a particular symptom/characteristic (Block 205'). The item parameters of ω (as used in Blocks 1701, 1703, 1705, 1707') are now symptom/characteristic parameters, and they can actually be accurately estimated if the data set used (Block 207') to calibrate the model includes patients with known disorders. This would improve the accuracy of the symptom/characteristic parameter calibration (Block 1707'). A particular patient can then be assigned a list of disorders that he/she has a high enough probability of having (Block 1711'), based on the posterior probabilities calculated from the UM estimation program. The report to a practitioner of the potential diagnoses may include the posterior probabilities assigned to each disorder (Block 1709'). The statistical analyses proceed similarly in both settings (Blocks 1701, 1703,1705, 1707', 1709', 1711'). The diagnosis is then used support the practitioners' diagnostic efforts (Block 1713').

One thing that differs between this situation and the educational measurement situation (except in psychiatry) is that there exist "gold standard" diagnoses for most disorders. Thus, the "symptom/characteristic calibration" can be done using patients that have known, and hence not latent, disorders.

Figure 17C:
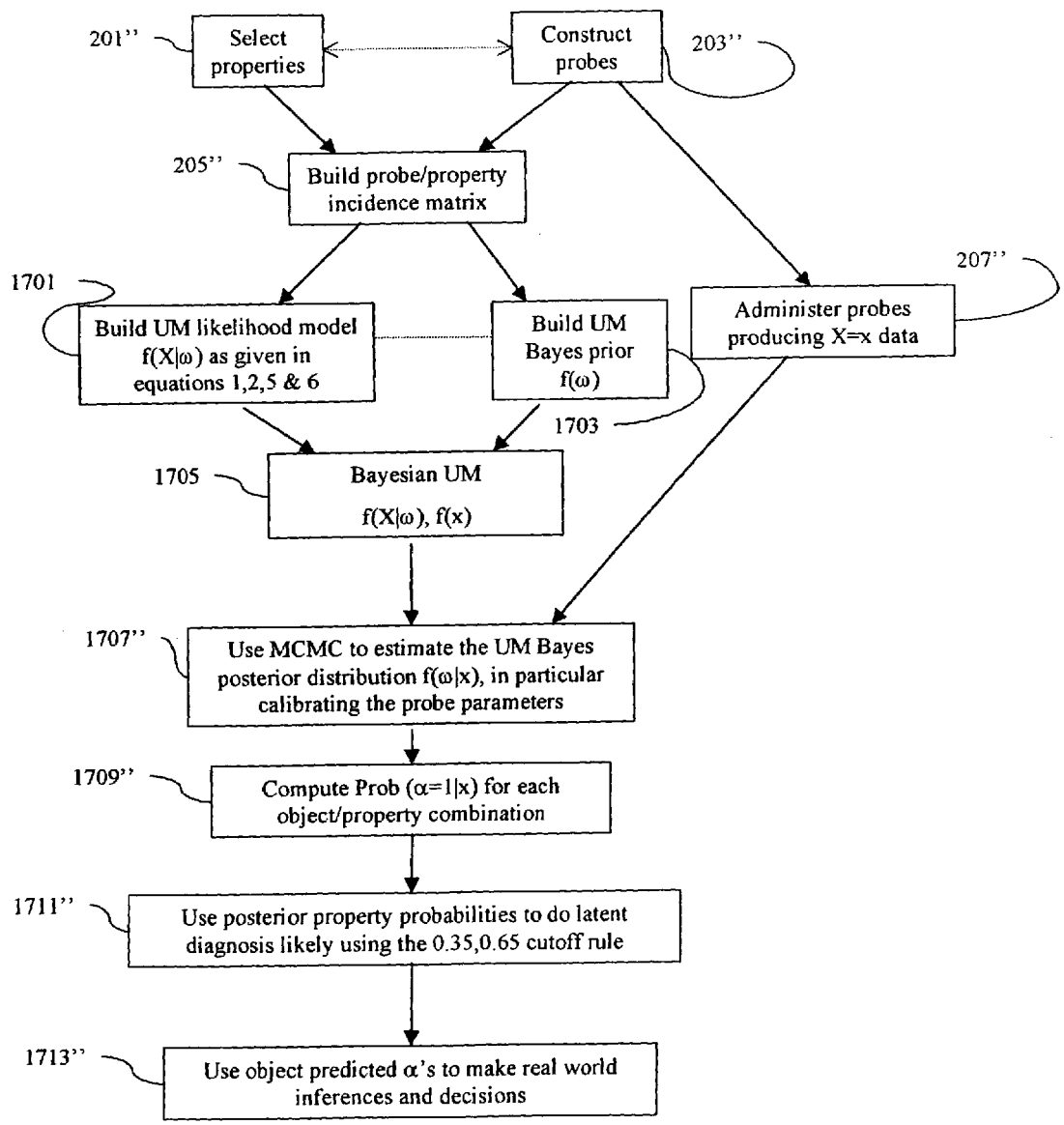
FIG. 17c displays the flow chart of the general UM procedure used in the present invention.

Applying the UM of the Present Invention in Novel Settings other than Educational or Medical/Psychiatric FIG. 17c presents the flow chart of the present invention applied in a generic setting. FIG. 17c should be compared with the cognitive diagnostic flow chart of the present UMCD invention of FIG. 17a applied in educational settings. The following correspondences are required:

| | | |
|---|---|---|
| Attributes | Properties | (Blocks 201", 205", 1709", 1711') |
| Test Items | Probes | (Blocks 203", 205", 207" 1707") |
| Item/attribute incidence matrix | Probe/property incidence matrix | (Block 205") |
| Cognitive diagnosis | Latent diagnosis | (Block 1711") |

The statistical analyses proceed similarly in both settings (Blocks 1701, 1703, 1705, 1707", 1709", 1711"). Because the setting is generic, all that can be said about its application is that the latent diagnostic results would be used to make inferences and possibly decisions about the real world setting in which the present invention is used.

A Semi-qualitative Description of the General Structure of the Equations and Relationships Undergirding the Present Invention Equations 1,2,5,and 6 and the definitions of $\pi^*$, $r^*$, c, $\underline{a}$, and $\theta$ are used to help explain the portions of the specific embodiment of the invention. The present invention is flowcharted in FIGS. 17a, 17b, and 17c, each flow chart for a different application. The terminology of cognitive diagnosis (FIG. 17a) will here be used for convenience, noting that the terminology of medical and psychiatric diagnosis (FIG. 17b) or the terminology of generic diagnosis (FIG. 17c) would function identically.

It is useful to describe to describe via an intermediate non-equation specified representation the essential components of the present invention. Equations 1,5, and 6 together with their identifiable and hence able to be calibrated parameters $r^*$'s and $\pi^*$'s provide one explication of the fact that (i) the probability of getting an item correct is increased by examinee mastery of all the attributes needed for the item as contrasted with lacking one or more needed attributes. Further, (ii) the more needed attributes that are not mastered the lower the probability of getting the item correct. The clauses (i) and (ii) above qualitatively describe the concept of positivity of an item, which is expressed in one specific manner in the embodiment of the present invention. In general any set of model equations may be used to capture the notion of positivity in a UM used in the present invention provided the parameters of the equations are identifiable, substantively meaningful to the practitioner, and express both (i) and (ii) stated above or express (i) alone.

Modeling completeness for the UM is characterized by using one or a low number of latent variables to capture the affect on the probability of getting an item correct caused by all influential attributes not explicitly listed in the model via the incidence matrix (Blocks 205, 205' and 205"). Any expression other than $P(\theta_j + c_i)$ of the present invention that expresses the fact that the attributes other than those explicitly listed in the UM incidence matrix can influence the probability of getting an item correct and that captures this influence parsimoniously with one or a small number of latent variables is an acceptable way to model UM completeness. The current embodiment specifies attribute mastery levels by setting the values of parameters $p_k$ as shown in the schematic of FIG. 16, noting that the current approach to setting mastery is tied to the Bayesian modeling approach of the present invention. However, any way of quantifying the user of an attribute based cognitive procedure setting attribute mastery levels suffices.

Further, any way of modeling associations between attributes suffices; this does not have to be done in a Bayesian framework using the $\sigma_{kk'}$ of FIG. 16.

Further, one could express the fact that each item requires certain attributes for its successful solution in other ways than an 0/1 incidence matrix (as done currently: see FIG. 19).

Thus, in summary, any ways of explicating the need for identifiable parameters expressing positivity and completeness, specifying attribute mastery levels, building into the model that attributes tend to be associated either positively in the educational settings or perhaps positively and/or negatively in other settings, and expressing the dependence on each item of a subset of the specified attributes provides a way of expressing aspects of the UMCD being claimed.

While a preferred application of the present invention is to use the UM, it should be understood that features of the present invention have non UM-based applications to diagnostic modeling and diagnostic procedures. Specifically, any model concerning objects, usually people, with two valued latent properties such as attributes or disorders may utilize the specifying of the level of possession of each property such as specifying the level of mastery or specifying the level of disorder judged to constitute a person having the disorder and further may utilize modeling a positive or negative association between properties such as attributes or disorders thus allowing the calibration and subsequent use of the estimated sizes of the associations to improve accuracy when carrying out diagnoses.

All of the above referenced publications are incorporated herein by reference in their entirety.

What we claim is:

1. A computer implemented method for providing remedial instruction to a student, the method comprising:
   receiving a response from a student for each of a plurality of items;
   determining an item/attribute incidence matrix, including reparameterizing and calibrating an underlying model as a Bayesian model with an assumed positive correlational attribute structure;
   determining a mastery value for each attribute based on the item responses and the item/attribute incidence matrix; and
   providing instruction to the student based on the determined mastery value.

2. The method of claim 1 wherein the item/attribute incidence matrix includes a first value for each entry corresponding to an attribute that is needed to correctly answer an item, wherein the item/attribute incidence matrix includes a second value for each entry corresponding to an attribute that is not needed to correctly answer an item.

3. The method of claim 1 wherein providing instruction to the student comprises:
   instructing the student in a subject pertaining to the attribute having a smallest mastery value.

4. The method of claim 1 wherein providing instruction to the student comprises:
   instructing the student in each subject pertaining to an attribute having a mastery value below a threshold.

5. The method of claim 1 wherein providing instruction to the student comprises:
   selecting a subject for instruction based on a pattern of mastery values across all attributes; and
   instructing the student in the subject for instruction.

6. A computer implemented method for providing remedial instruction to a plurality of students, the method comprising:
   receiving a response from each of one or more students for each of a plurality of items;
   determining an item/attribute incidence matrix, including reparameterizing and calibrating an underlying model as a Bayesian model with an assumed positive correlational attribute structure;
   for each student, determining a mastery value for each attribute based on the item responses received from the student and the item/attribute incidence matrix; and
   providing instruction based on the determined mastery values.

7. The method of claim 6 wherein the item/attribute incidence matrix includes a first value for each entry corresponding to an attribute that is needed to correctly answer an item, wherein the item/attribute incidence matrix includes a second value for each entry corresponding to an attribute that is not needed to correctly answer an item.

8. The method of claim 6 wherein providing instruction based on the determined mastery values comprises:
   for each attribute, determining the average mastery value for the attribute for a plurality of students; and
   instructing the plurality of students in a subject pertaining to the attribute having a smallest average mastery value.

9. The method of claim 6 wherein providing instruction based on the determined mastery values comprises:
   for each attribute, determining an average mastery value for the attribute for a plurality of students; and
   instructing the plurality of students in a subject pertaining to each attribute having an average mastery value below a threshold.

10. The method of claim 6 wherein providing instruction based on the determined mastery values comprises:
    selecting a subject for instruction based on a pattern of mastery values across all attributes; and
    instructing the plurality of students in the subject for instruction.

11. The method of claim 6, further comprising:
    for each student, placing the student into one of a plurality of groups based on a pattern of mastery values across all attributes.

12. The method of claim 11, further comprising, for each group:
    selecting a subject for instruction based on the pattern of mastery values for the group; and
    instructing the group in the subject for instruction.

13. The method of claim 11, further comprising:
    placing each group in an instructional module based on the pattern of mastery values for the group.

14. A computer implemented method for assessing instructional effectiveness, the method comprising:
    receiving a response from each of a plurality of students for each of a plurality of items;
    determining an item/attribute incidence matrix, including reparameterizing and calibrating an underlying model as a Bayesian model with an assumed positive correlational attribute structure;
    for each student, determining a mastery value for each attribute based on the item responses received from the student and the item/attribute incidence matrix;
    for each attribute, determining an average mastery value for all students; and
    for each attribute, determining an effectiveness for instruction based on the average mastery value.

* * * * *

UNITED STATES PATENT AND TRADEMARK OFFICE
CERTIFICATE OF CORRECTION

PATENT NO.         : 7,457,581 B2
APPLICATION NO.    : 10/970795
DATED              : November 25, 2008
INVENTOR(S)        : William F. Stout and Sarah M. Hartz It is certified that error appears in the above-identified patent and that said Letters Patent is hereby corrected as shown below:

In column 10 line 49 replace "is is" by "is".

In column 15 line 54 replace "probabililty" by "probability".

In column 19 line 63 replace "genereal" by "general".

In column 24 line 56 replace "the the" by "the".

In column 26 line 12 replace "Paramerization" by "Parameterize".

In column 27 lines 43-44 replace "reparametization" by "reparametrization".

Signed and Sealed this

Seventeenth Day of March, 2009

JOHN DOLL
*Acting Director of the United States Patent and Trademark Office*